United States Patent
Kim et al.

(10) Patent No.: US 7,656,496 B2
(45) Date of Patent: Feb. 2, 2010

(54) LIQUID CRYSTAL DISPLAY DEVICE AND METHOD FOR FABRICATING THE SAME

(75) Inventors: Jong Woo Kim, Kyongsangbuk-do (KR); Won Hyung Yoo, Kumi-shi (KR)

(73) Assignee: LG. Display Co., Ltd., Seoul (KR)

( * ) Notice: Subject to any disclaimer, the term of this patent is extended or adjusted under 35 U.S.C. 154(b) by 42 days.

(21) Appl. No.: 10/949,504

(22) Filed: Sep. 24, 2004

(65) Prior Publication Data
US 2005/0243262 A1 Nov. 3, 2005

(30) Foreign Application Priority Data
Apr. 30, 2004 (KR) .................. 10-2004-0030531

(51) Int. Cl.
*G02F 1/1339* (2006.01)
(52) U.S. Cl. .................. 349/155; 349/156
(58) Field of Classification Search .............. None
See application file for complete search history.

(56) References Cited

U.S. PATENT DOCUMENTS

| | | | | |
|---|---|---|---|---|
| 4,295,712 | A * | 10/1981 | Ishiwatari | 349/156 |
| 5,739,882 | A * | 4/1998 | Shimizu et al. | 349/123 |
| 6,310,677 | B1 * | 10/2001 | Togano et al. | 349/172 |
| 6,437,848 | B1 * | 8/2002 | Okada et al. | 349/156 |
| 2003/0117538 | A1 * | 6/2003 | Lim et al. | 349/43 |
| 2005/0099577 | A1 * | 5/2005 | Lee et al. | 349/155 |

FOREIGN PATENT DOCUMENTS

| | | |
|---|---|---|
| JP | 55-28004 | 2/1980 |
| JP | 02-285326 | 11/1990 |
| JP | 06-317813 | 11/1994 |
| JP | 06-331994 | 12/1994 |
| JP | 08-114809 | 5/1996 |
| JP | 9-73093 | 3/1997 |

(Continued)

OTHER PUBLICATIONS

The Rejection dated Apr. 11, 2006 for corresponding Korean Application No. 10-2004-0030531.

(Continued)

*Primary Examiner*—David Nelms
*Assistant Examiner*—Lucy P Chien
(74) *Attorney, Agent, or Firm*—Brinks Hofer Gilson & Lione

(57) ABSTRACT

A liquid crystal display (LCD) device is divided into an active region and a liquid crystal margin region. The LCD includes a thin film transistor substrate that includes gate and data lines crossing each other to define pixel regions, and thin film transistors in the active region. A color filter substrate has column spacers in the active region that contact a portion corresponding to a region of the thin film transistor and the gate or data lines. The column spacers contacting the thin film transistor region provide an elastic gap between the substrates. The column spacers in the gate/data line region are separated from the color filter substrate. Other column spacers are formed in the liquid crystal margin region in a honeycomb arrangement. A liquid crystal layer is disposed between the thin film transistor and color filter substrates.

21 Claims, 25 Drawing Sheets

FOREIGN PATENT DOCUMENTS

| | | |
|---|---|---|
| JP | 10-153797 | 6/1998 |
| JP | 10-325959 | 12/1998 |
| JP | 2001-100652 | 4/2001 |
| JP | 2001-209053 | 8/2001 |
| JP | 2001-222000 | 8/2001 |
| JP | 2002-328375 | 11/2002 |
| JP | 2002-341354 | 11/2002 |
| JP | 2002-372717 | 12/2002 |
| JP | 2003-005191 | 1/2003 |
| JP | 2003-215553 | 7/2003 |

OTHER PUBLICATIONS

Office Action dated Feb. 2, 2007 for corresponding Japanese Patent Application No. 2004-372367.

\* cited by examiner

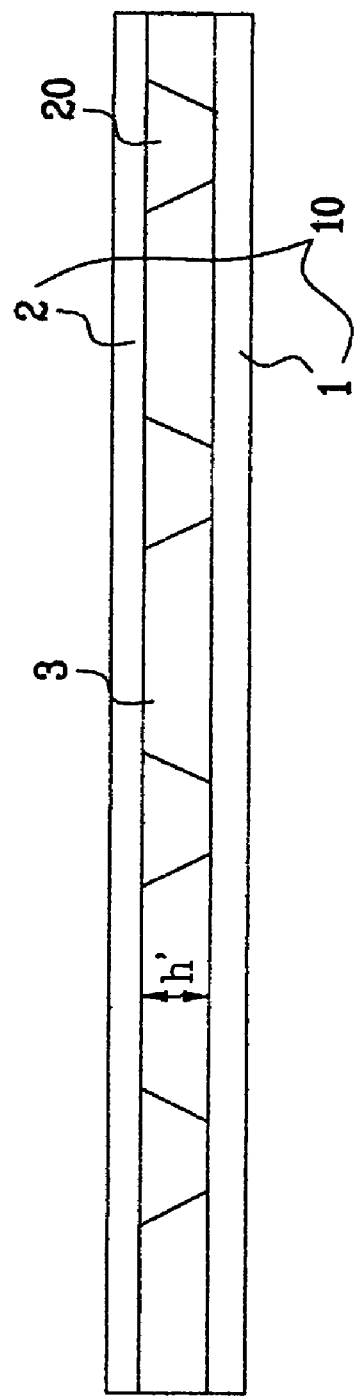
FIG. 1A Related Art
FIG. 1B Related Art

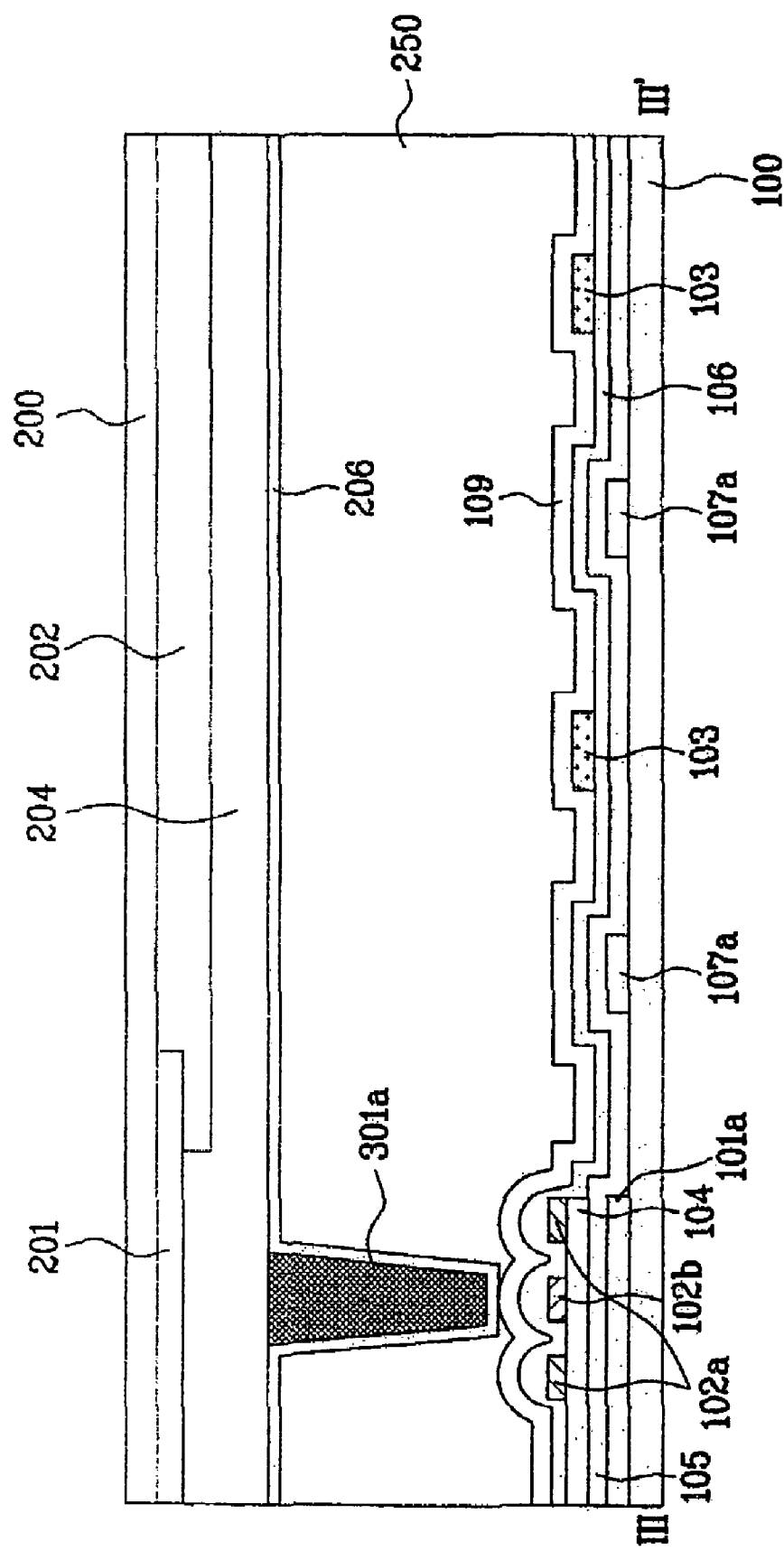

LIQUID CRYSTAL DISPLAY DEVICE AND METHOD FOR FABRICATING THE SAME

CLAIM FOR PRIORITY

This application claims the benefit of the Korean Application No. P2004-30531, filed on Apr. 30, 2004, which is hereby incorporated by reference.

BACKGROUND

1. Technical Field

The present invention relates to a liquid crystal display (LCD) device, and more particularly, to a liquid crystal display (LCD) device, in which incomplete dispensation of liquid crystal, gravity defects and foreign material generated internally are mitigated by forming column spacers that maintain a cell gap in an active region and a honeycomb-shaped arrangement of column spacers in a margin region.

2. Related Art

As the demand for various display devices increases, development of various types of flat display devices, such as LCD devices, plasma display panel (PDP) devices, electroluminescent display (ELD) devices, and vacuum fluorescent display (VFD) devices, has increased. Among these various flat display devices, LCD devices have been used commonly because of their thin profile, light weight, and low power consumption. LCD devices are used commonly as a substitute for cathode ray tube (CRT) devices. In addition, LCD devices are used commonly in notebook computers, computer monitors, and televisions. However, to use LCD devices as general display devices in a large sized screen, it is desirable to display images having high resolution and luminance in addition to maintaining the light weight and thin profile and low power consumption of the overall device.

In LCD devices, different types of spacers are used to maintain the cell gap between the substrates forming the LCD device. Depending on the method of fabrication, these spacers are spherical or columnar. The spherical spacers are added after the substrates are fabricated and the column spacers are provided during fabrication of one of the substrates. The column spacers are formed in specific portions of the LCD device and the spherical spacers are free moving and are randomly scattered throughout the LCD device.

Spherical spacers are used when forming the LCD panel using an injection method in which the substrates are fabricated and then liquid crystal injected into the cavity therebetween. However, this method requires significant amounts of time to inject the liquid crystal material, thereby lowering production yield. It is also difficult to completely inject the liquid crystal material when forming large LCD devices. In addition, as several liquid crystal injection devices are filled at the same time due to the complicated process and the considerable process time involved, a large space is required.

In a liquid crystal dispensing method, two substrates are bonded to each other after dispensing liquid crystal material on one of the substrates. Spherical spacers cannot be used to maintain the cell gap in this method as the spherical spacers move along a dispensing direction of the liquid crystal material. Instead, column spacers fixed to the substrate maintain the cell gap. However, the use column spacers engender problems not encountered by spherical spacers.

FIG. 1A is a schematic cross sectional view of a color filter substrate on which a column spacer is fabricated. FIG. 1B is a schematic cross sectional view of the bonding state of the TFT substrate and the color filter substrate. FIG. 1A shows the column spacers 20 formed on the color filter substrate 2. Each column spacer 20 has a height h. As shown in FIG. 1B, when the color filter substrate 2 is bonded to the TFT substrate 1 on which liquid crystal is dispersed, the height (h) of the column spacer 20 is decreased to (h'), which corresponds to the cell gap. This difference in thickness (h-h') is defined as the gravity margin.

As can be seen, the contact area between the column spacers and the relatively flat TFT substrate is relatively large, making it hard to obtain the gravity margin (h-h'). Also, if the LCD device is maintained at a high temperature, a protruding portion may develop due to expansion of the liquid crystal, making it harder to obtain the gravity margin. Moreover, if the LCD panel is placed in a vertical direction for an extended period of time, such as when the LCD panel is used for a television monitor, gravity causes the liquid crystal molecules to move to a lower portion of the panel, creating a protruding portion and also making it harder to obtain the gravity margin. As a result, if an excessive amount of the liquid crystal is provided or the liquid crystal is maintained at a high temperature or the LCD device is tilted, a gravity defect may exist.

Further, the large contact areas generate large frictional forces when the substrates move relative to each other. The frictional forces prevent restoration of the liquid crystal molecules to the original state and generate long-lasting spots on the screen of the LCD device. This is shown more graphically in FIG. 2A and FIG. 2B, which are cross sectional and plane views of a portion having touch spots in a conventional LCD device.

As described above and shown in these figures, when the LCD panel 10 is continuously touched with a finger along a particular direction, the upper substrate of the LCD panel is shifted by an amount along the touch direction. The liquid crystal molecules between the column spacers 20 are not restored to their original states, thereby generating spots on the screen. In addition, when the LCD panel is touched, as shown in FIG. 2B, the liquid crystal molecules gather around the touched portion causing the region around the touched portion to protrude. In this case, the cell gap "h1" corresponding to the protruding portion is higher than the cell gap "h2" of the remaining portion, thereby causing light leakage due to irregular alignment of the liquid crystal molecules. Additionally, since the touched portion has a decreased amount of liquid crystal molecules, blurred portions appear on the screen in a black state, thereby deteriorating luminance of the LCD panel 10. Furthermore, if the LCD panel is pressed at a portion in which column spacers are not present, the substrates bend and form a hollow state due to low restoring speed of the substrates, thereby generating spots on the screen of the LCD panel.

When an external force is applied to the screen of the LCD device, the liquid crystal molecules are displaced from an active region, in which images are displayed, to a liquid crystal margin region, in which images are not displayed. This causes incomplete dispensation of the liquid crystal in the active region and thus, black spots to appear on the screen. Even if a dam is present between the active region and the liquid crystal margin region to contain the liquid crystal molecules after they have migrated and the external force is removed or the temperature restored to the ambient temperature, the liquid crystal molecules are not entirely restored to the active region. Moreover, shifting of the column spacer due to application of the external force causes peeling at the contact portion of the alignment layer of the TFT substrate and the column spacer. This peeling generates foreign material, which is then dispersed throughout the active region.

SUMMARY

By way of introduction only, in one embodiment a liquid crystal display (LCD) device has an active region and a liquid crystal margin region. The LCD includes a first substrate having a thin film transistor array in the active region. The thin film transistor array contains gate and data lines crossing each other to define pixel regions, and thin film transistors. A second substrate has a first column spacer contacting a portion corresponding to a channel region of one of the thin film transistors in the active region, and second column spacers formed in the liquid crystal margin region. A liquid crystal layer is disposed between the first and second substrates.

A third column spacer is formed on the second substrate between first column spacers. The third column spacer is separated from the first substrate at a portion corresponding to the gate line or the data line.

In another embodiment, a liquid crystal display (LCD) device includes first and second substrates facing each other. Each substrate includes an active region and a liquid crystal margin region. Gate and data lines cross each other in the active region of the first substrate to define pixel regions. Thin film transistors are formed at crossing points of the gate and data lines. Pixel electrodes and common electrodes are formed in the pixel regions. A black matrix layer is formed on the active region of the second substrate at portions other than the pixel regions. A color filter layer is formed on the second substrate corresponding to the pixel regions in the active region. An overcoat layer is formed on the second substrate in the active region. A first column spacer is formed on the overcoat layer of the second substrate corresponding to a channel region of one of the thin film transistors. Second column spacers are formed on the second substrate corresponding to the liquid crystal margin region. A liquid crystal layer is disposed between the first and second substrates.

In another embodiment, a liquid crystal display (LCD) device includes first and second substrates facing each other. Each substrate includes an active region and a liquid crystal margin region. Gate and data lines cross each other on the active region of the first substrate to define pixel regions. Thin film transistors are formed at crossing points of the gate and data lines. Pixel electrodes are formed in the pixel regions. A black matrix layer is formed on the active region of the second substrate at portions other than the pixel regions. A color filter layer is formed on the second substrate corresponding to the pixel regions in the active region. A common electrode is formed on the second substrate in the active region. A first column spacer is formed on the common electrode of the second substrate corresponding to a channel region of one of the thin film transistors. Second column spacers are formed on the second substrate corresponding to the liquid crystal margin region. A liquid crystal layer is disposed between the first and second substrates.

In another embodiment, a liquid crystal display (LCD) device has an active region and a liquid crystal margin region. The LCD includes a first substrate having a thin film transistor array. The active region of thin film transistor array contains thin film transistors and gate and data lines crossing each other to define pixel regions. A second substrate has a first column spacer in contact with a portion corresponding to the thin film transistor in the active region and second column spacers formed in the liquid crystal margin region. A liquid crystal layer is disposed between the first and second substrates.

In another embodiment, a method for fabricating an LCD device includes preparing first and second substrates, each having an active region and a liquid crystal margin region; forming a thin film transistor array including gate and data lines and thin film transistors on the active region of the first substrate, the gate and data lines crossing each other to define pixel regions; forming a first column spacer in contact with a portion corresponding to a channel region of the thin film transistor in the active region and second column spacers formed in the liquid crystal margin region; and disposing a liquid crystal layer between the first and second substrates.

In another embodiment, a display device includes opposing first and second substrates. The first substrate contains, in an active region, gate lines and data lines that cross each other to form pixel regions, and thin film transistors and pixel electrodes associated with the pixel regions. A first spacer disposed in the active region is formed on one of the substrates. The first spacer contacts the second substrate and a portion of the first substrate corresponding to one of the thin film transistors. Second spacers are disposed in the margin region.

In another embodiment, a display device includes opposing first and second substrates. Spacers are disposed in a margin region. At least some of the spacers disposed in an active region and formed on one of the substrates contact both the substrates.

It is to be understood that both the foregoing general description and the following detailed description of the present invention are exemplary and explanatory and are intended to provide further explanation of the invention as claimed.

BRIEF DESCRIPTION OF THE DRAWINGS

The inventions can be better understood with reference to the following drawings and description. The components in the figures are not necessarily to scale, emphasis instead being placed upon illustrating the principles of the inventions. Moreover, in the figures, like referenced numerals designate corresponding parts throughout the different views.

FIGS. 1A and 1B are schematic cross sectional views of a color filter substrate having a column spacer and a bonding state between a TFT substrate and a color filter substrate according to the related art, respectively;

FIGS. 18A and 18B are cross sectional views along III-III' and IV-IV' of FIG. 10, respectively.

DETAILED DESCRIPTION OF THE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 2A:
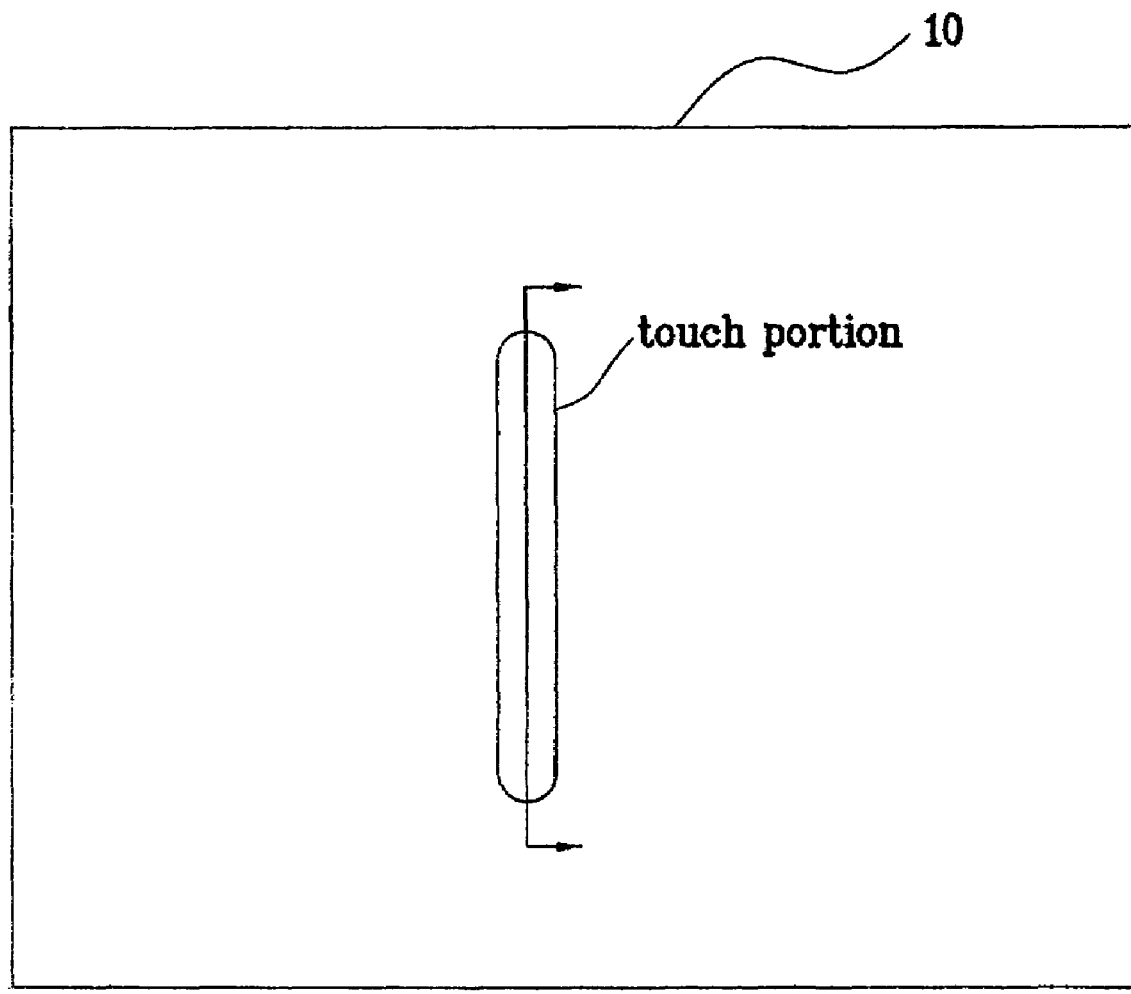
FIG. 2A and FIG. 2B are cross sectional and plane views of a portion having touch spots in an LCD device according to the related art, respectively.
Figure 2B:
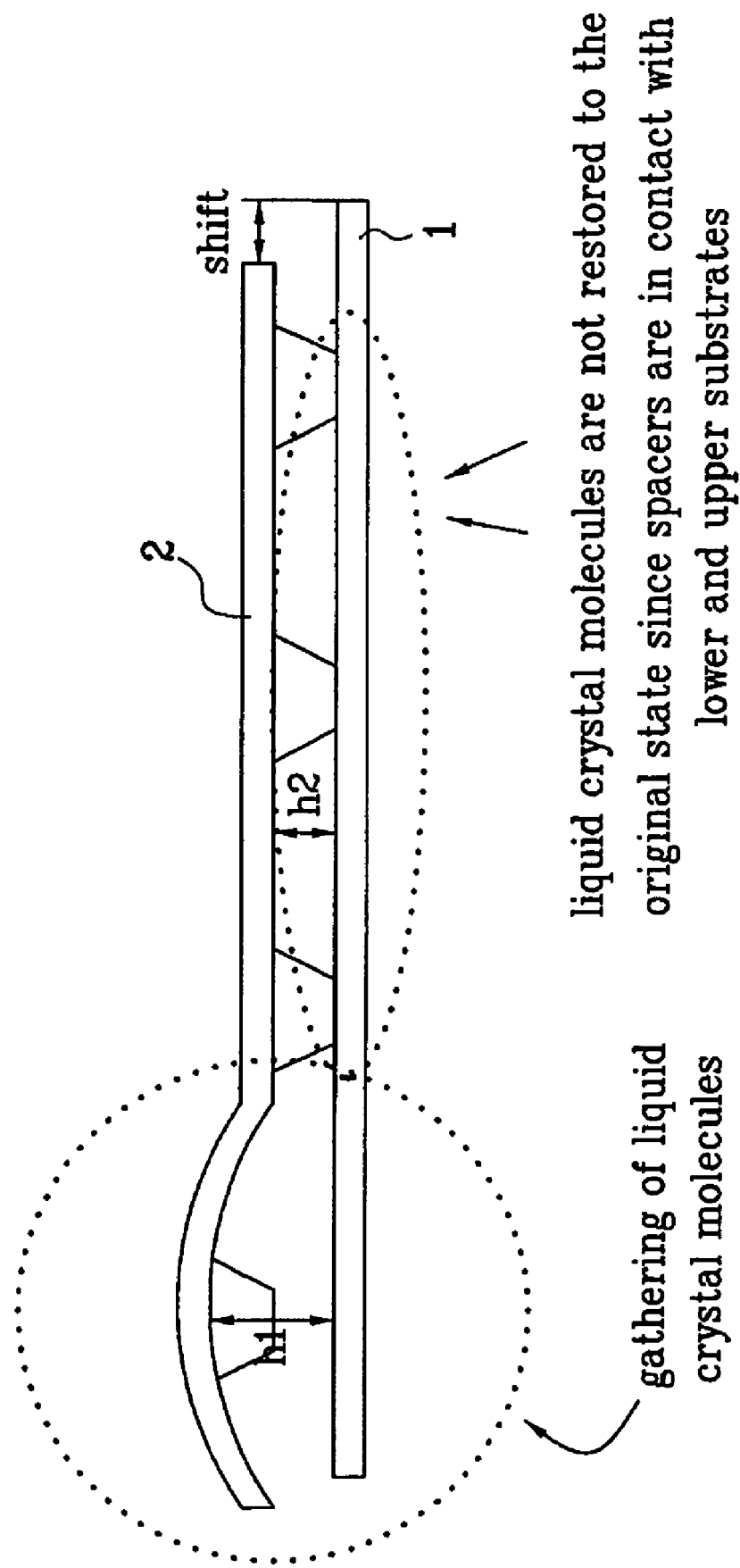
Figure 3:
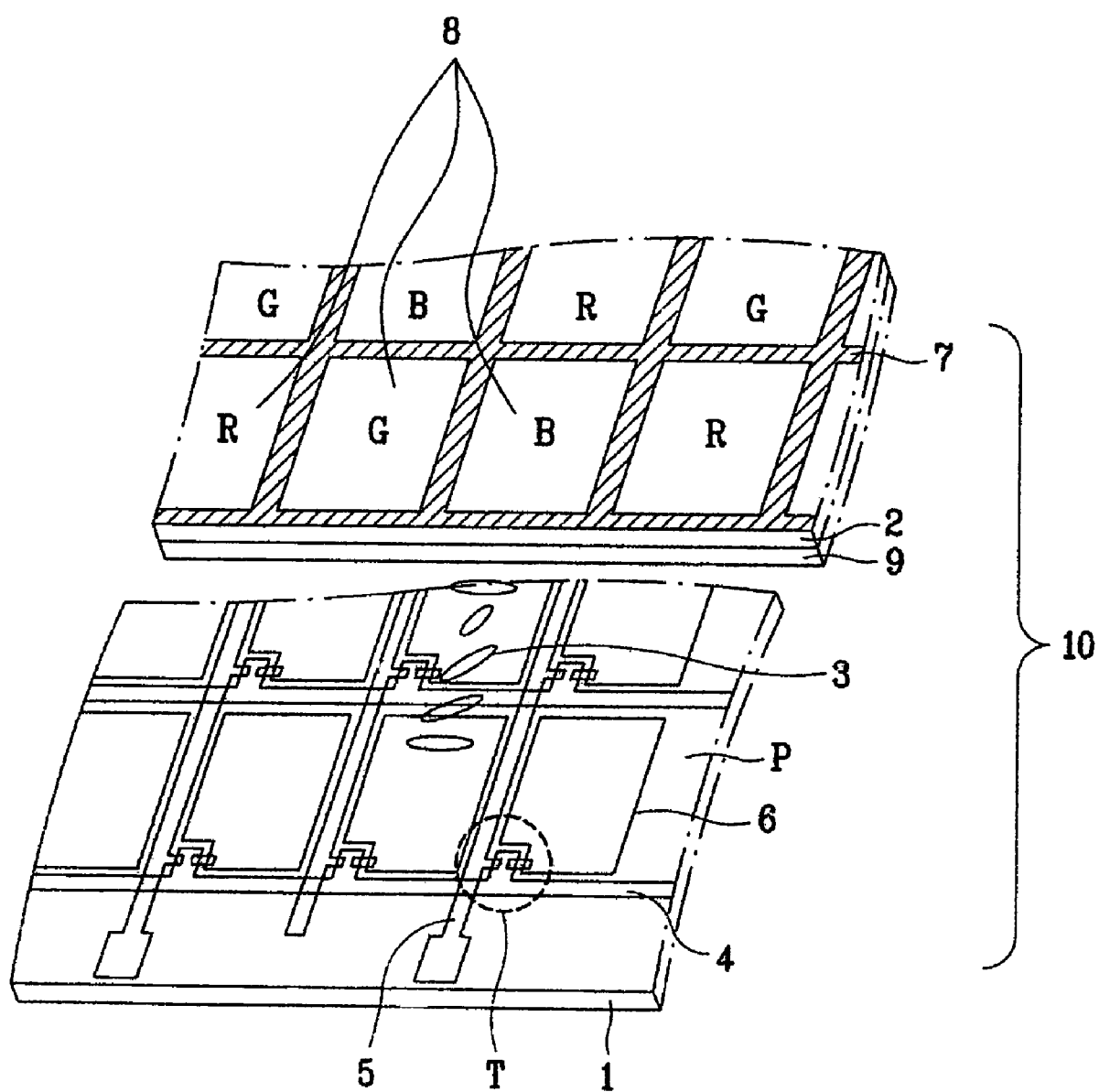
FIG. 3 is an exploded perspective view of one embodiment of the present LCD device.

FIG. 3 is an exploded perspective view of an active region of a general twisted nematic (TN) mode LCD device. The LCD device includes a TFT substrate 1, a color filter substrate 2 and a liquid crystal layer 3 between the TFT substrate 1 and the color filter substrate 2. The TFT substrate 1 has a plurality of gate lines 4, a plurality of data lines 5, a plurality of thin film transistors T and a plurality of pixel electrodes 6. The color filter substrate 2 has a black matrix layer 7, a Red/Green/Blue (R/G/B) color filter layer 8, and a common electrode 9.

In a TN mode LCD device, the alignment direction of the liquid crystal molecules of the liquid crystal layer 3 is controlled by the induced electric field provided thereto by a potential difference between the pixel electrodes 6 and the common electrode 9. Light transmitted through the liquid crystal layer 3 is controlled by the alignment direction of the liquid crystal molecules, thereby displaying images. In another type of LCD device, an in-plane switching (IPS) mode LCD device, the pixel and common electrodes are formed in a pixel region in parallel to each other at a fixed interval therebetween. Accordingly, an electric field parallel to the substrates is generated between the pixel electrode and the common electrode, thereby aligning liquid crystal molecules of a liquid crystal layer by the electric field parallel to the substrates.

Figure 4:
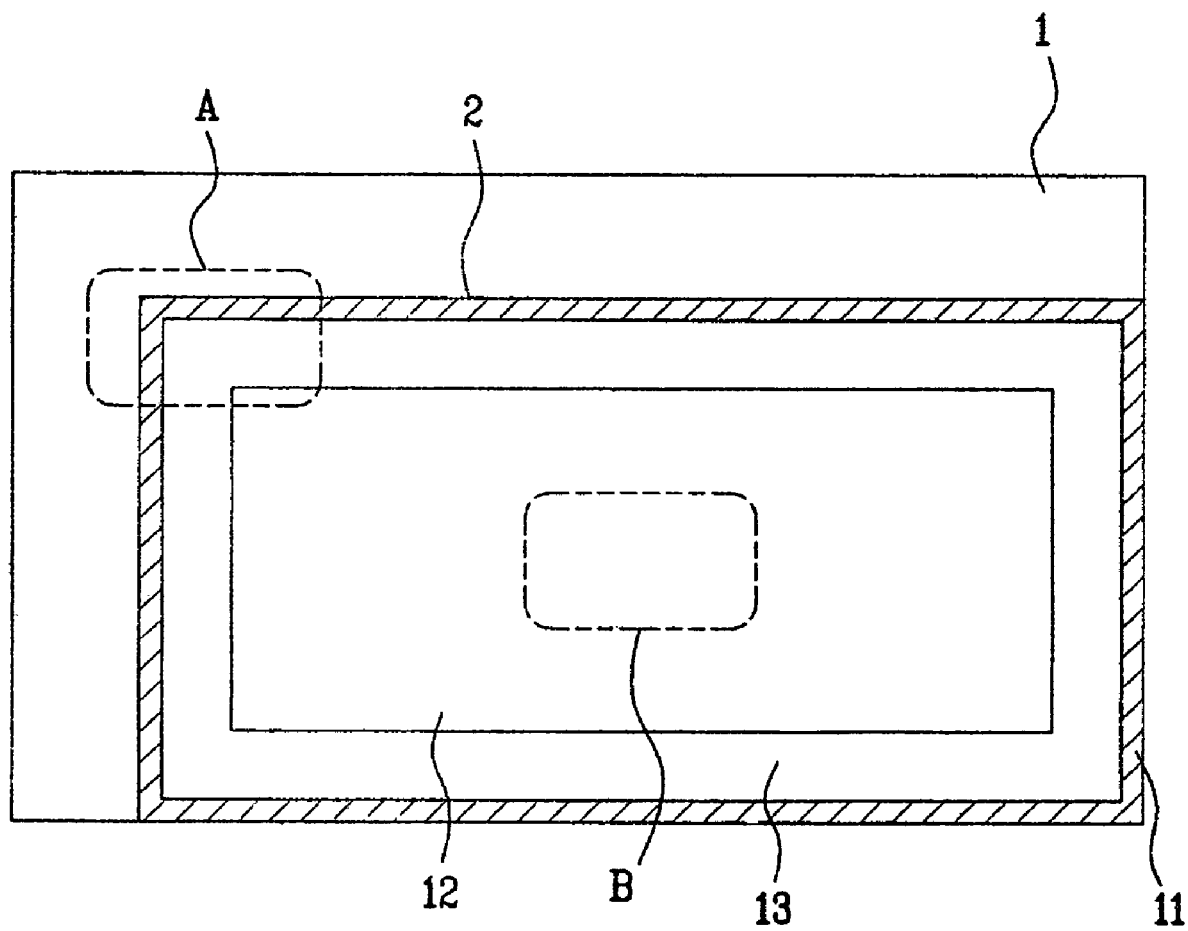
FIG. 4 is a plane view of one embodiment of the present LCD device.

Both LCD devices above include an active region, in which images are displayed, and a liquid crystal margin region formed between the active region and the seal pattern as shown in the plan view of FIG. 4. The TFT substrate 1 and the color filter substrate 2 are bonded to each other along the circumference by a seal pattern 11, and a liquid crystal layer is formed between the TFT substrate 1 and the color filter substrate 2 bonded by the seal pattern 11. The liquid crystal margin region 13 is formed around the active region 12 between the active region 12 and the seal pattern 11. The liquid crystal margin region 13 is hidden by the black matrix layer. The liquid crystal margin region 13 is a margin for spread of the liquid crystal between the two substrates.

Figure 5:
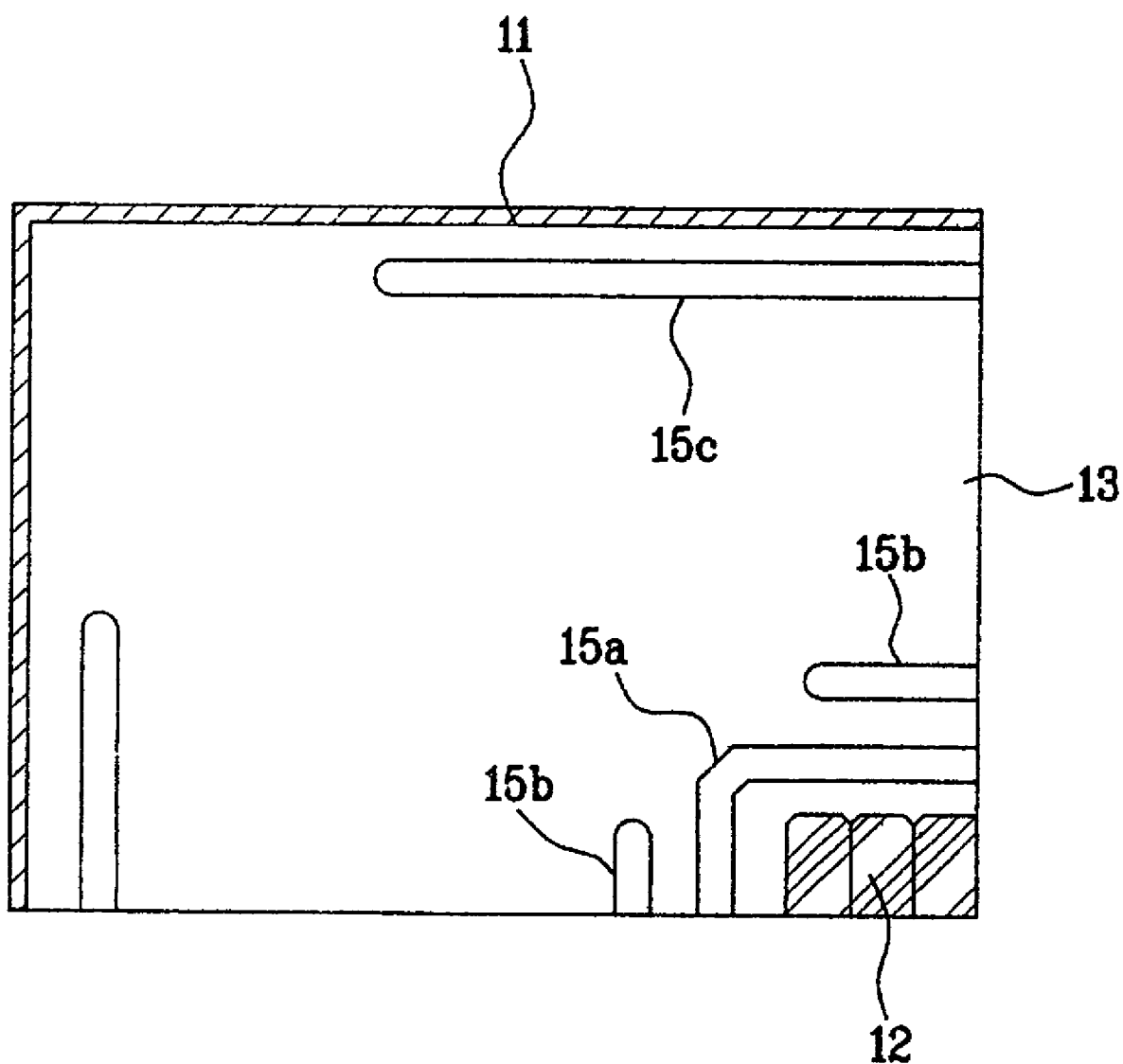
FIG. 5 is an expanded plane view of the liquid crystal margin region in FIG. 4.

A portion of the active region "B" in FIG. 4 is shown in FIG. 3 and a portion of the margin region "A" is shown in FIG. 5. As shown in FIG. 5, a first dam 15a and a second dam 15b are formed in the boundary between the active region 12 and the liquid crystal margin region 13, and a third dam 15c is formed adjacent to the seal pattern 11. These dams provide containment for excess liquid crystal that has been moved due to contact between a user and the surface of the LCD device or due to thermal expansion of the liquid crystal.

Figure 6:
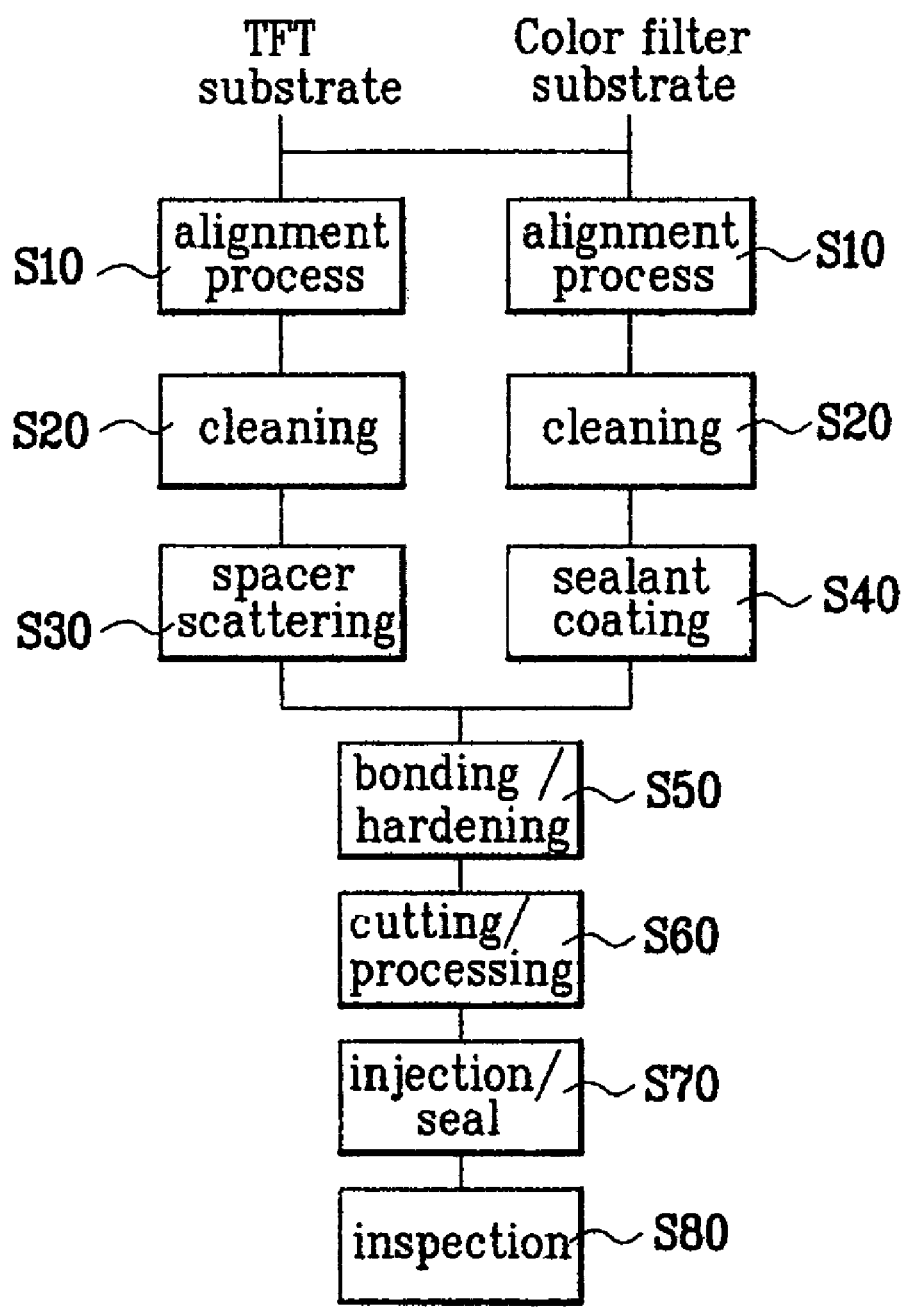
FIG. 6 is a flow chart of an injecting method of fabricating a liquid crystal LCD device.

LCD devices are fabricated either by liquid crystal injection or dispensing. FIG. 6 is a flow chart of a conventional method of fabricating an LCD device using liquid crystal injection. The method for fabricating an LCD device includes three processes: an array process, a cell process, and a module process.

The array process includes forming a TFT array and forming a color filter array. During the array process, a plurality of LCD panels are fabricated on one large sized glass substrate, and the TFT array and the color filter array are formed within each of the LCD panels.

The TFT substrate and the color filter substrate are then moved to a cell process line. An alignment material is coated on the TFT substrate and the color filter substrate, and an alignment process (rubbing process) S10 is performed on the substrates to obtain a uniform alignment direction of liquid crystal molecules. The alignment process S10 includes cleaning the substrate before coating the alignment layer on the substrate, printing the alignment layer on the substrate, baking the alignment layer on the substrate, inspecting the alignment layer on the substrate, and rubbing the alignment layer on the substrate. After the performing alignment process, the TFT substrate and the color filter substrate are respectively cleaned (S20).

Spherical spacers are scattered on one of the two substrates (S30) and a seal pattern is formed corresponding to the circumference of respective LCD panel regions to bond the two substrates to each other (S40). The seal pattern includes a liquid crystal injection inlet through which liquid crystal material is injected. The spherical spacers are formed of plastic spheres or minute elastic particles. The TFT substrate and the color filter substrate are positioned to oppose each other and bonded to each other, and the seal pattern is hardened (S50).

In the module process, the bonded TFT and color filter substrates are cut into individual LCD panel regions (S60). The liquid crystal material is injected into the LCD panel through the liquid crystal injection inlet, and the liquid crystal injection inlet is sealed (S70). In a subsequent inspection process (S80), the external appearances of the LCD panels are observed and the panels are tested for electric failure.

During the process for injecting the liquid crystal material, the LCD panel and a container having liquid crystal material therein are provided in a vacuum chamber. Accordingly, moisture and air bubbles in the liquid crystal material and the container are simultaneously removed, and an interior space of the LCD panel is maintained in a vacuum. The liquid crystal injection inlet of the LCD panel is dipped into the container and the vacuum inside the chamber is removed to allow the chamber to equalize to atmospheric pressure. This causes the liquid crystal material to be injected into the interior of the LCD panel through the liquid crystal injection inlet using the pressure difference between the interior of the LCD panel and the vacuum chamber.

Figure 7:
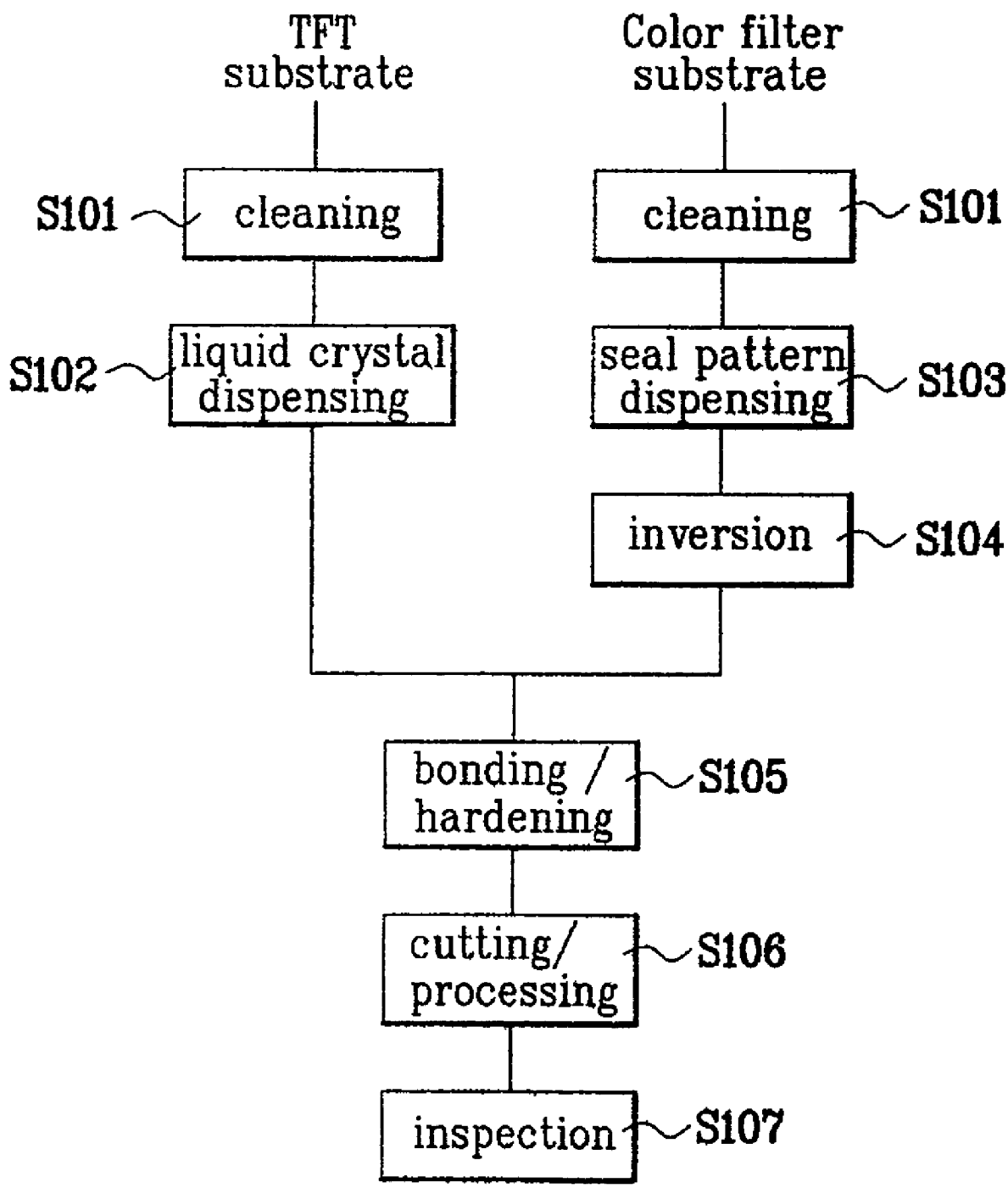
FIG. 7 is a flow chart of a dispensing method of fabricating a liquid crystal type LCD device.

An alternate conventional liquid crystal dispensing method of fabricating an LCD is shown in FIG. 7. In the liquid crystal dispensing method, before bonding the two substrates, the liquid crystal material is dispensed on either the TFT or color filter substrate. Column spacers are fabricated on the substrate during an array process using photolithography or inkjet printing. For example, when the column spacers are fabricated on the color filter substrate, a photosensitive resin is formed on the common electrode and selectively removed to form the column spacer on the common electrode above the black matrix layer. The term column is used only to describe the extension of the spacer from the substrate on which the spacer is formed or otherwise attached toward the other substrate and is not intended limit the shape of the spacer in any way.

After the column spacers have been formed, alignment layers are coated on the surface of the TFT and color filter substrates including the column spacers and a rubbing process is performed thereto. After cleaning the TFT substrate and the color filter substrate (S101), the liquid crystal material is dispensed on one of the substrates (S102) and a seal pattern is formed in the circumference of an LCD panel region on the other of the substrates by a dispensing device (S103). The substrate that does not contain the liquid crystal material is inverted (S104), the TFT substrate and the color filter substrate are bonded to each other by pressure, and the seal pattern is hardened (S105). Subsequently, the bonded substrates are cut into the respective LCD panels (S106). An inspection process (S107) similar to that above is performed to complete the fabrication.

The active region of the LCD device can contains column spacers in various arrangements, as shown in FIG. 8A to FIG. 8E, and FIG. 9A and FIG. 9B. In these figures, gate and data lines 101 and 102 cross each other to define a pixel region, thin film transistors TFT are formed at a crossing portion of the gate and data lines 101 and 102, pixel electrodes 103 are formed in the pixel regions, first column spacers 301a provided at fixed intervals maintain the cell gap, and third column spacers 301b provided at fixed intervals prevent a hollow state from occurring. Although shown in the figures, the third column spacers may or may not be present in each embodiment.

Figure 8A:
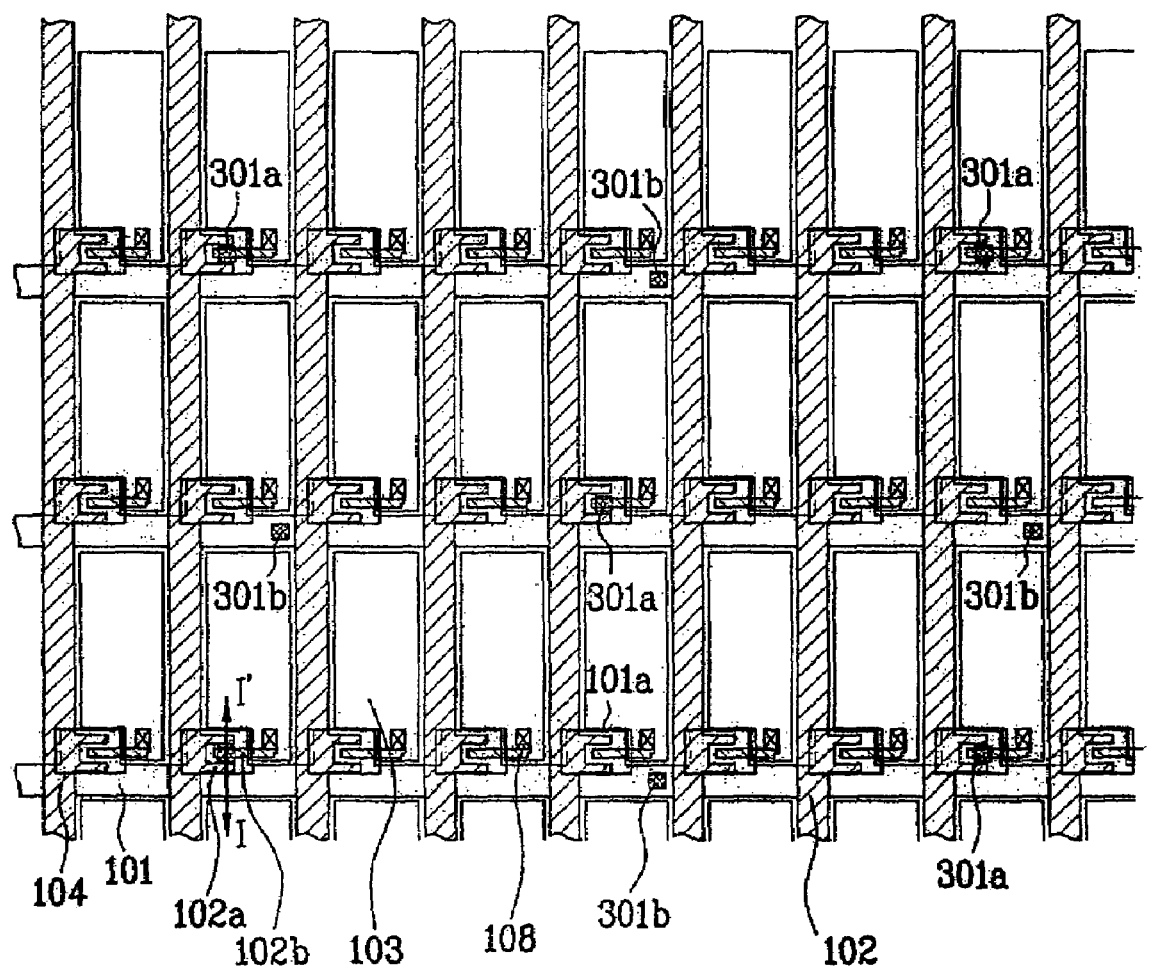
FIGS. 8A-8E are an expanded plane view of an active region in a TN mode LCD device according to different embodiments.
Figure 9A:
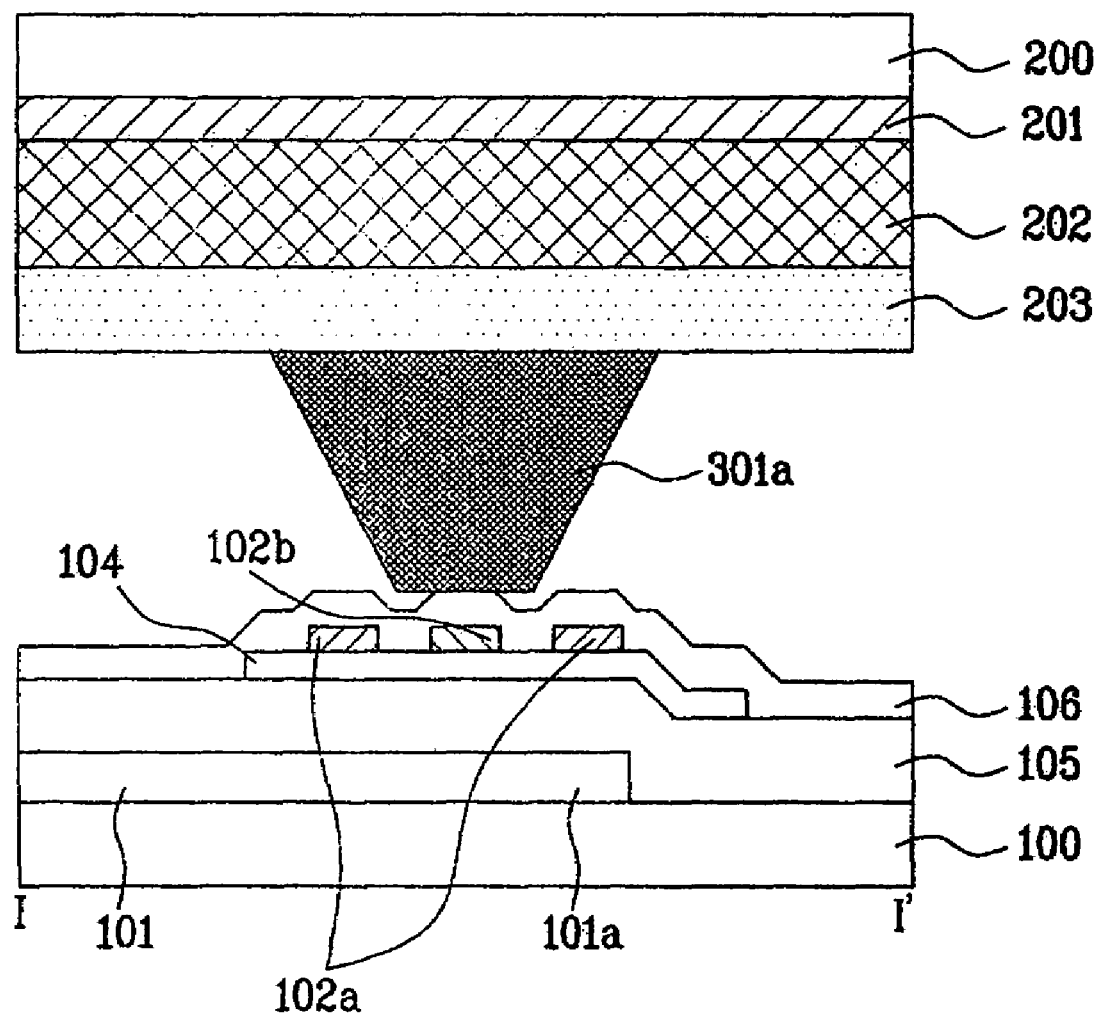
FIG. 9A and FIG. 9B are cross sectional views of a portion having first and second column spacers along I-I' of FIG. 8A.
Figure 9B:
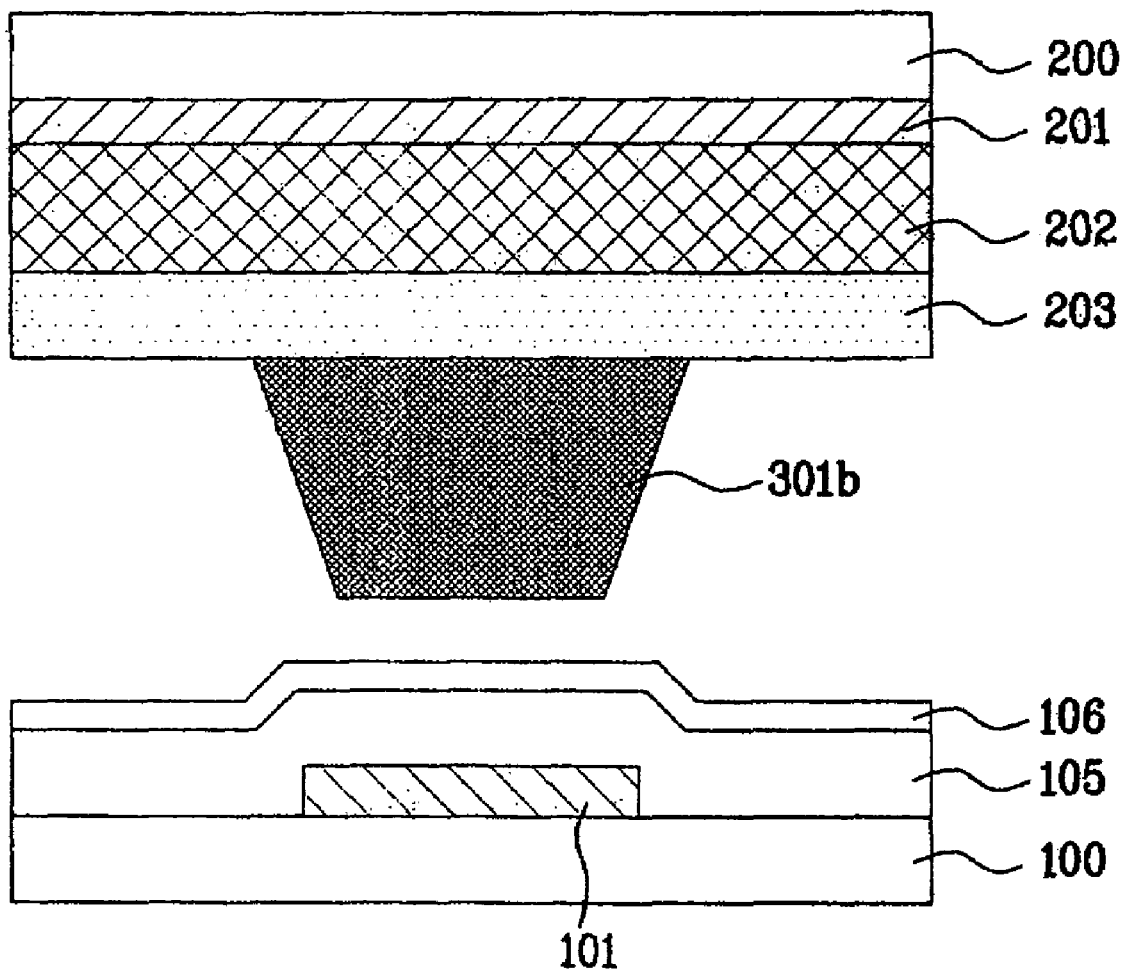

In the embodiment shown in FIG. 8A, the first column spacers 301a are disposed every six pixel regions and the third column spacers 301b are disposed between adjacent first column spacers 301a. The first column spacer 301a, as shown in FIG. 9A, is formed in a portion that corresponds to a channel region of the thin film transistor. As shown in FIG. 9B, the third column spacer 301b is formed in a portion that corresponds to the gate line 101. In this state, even though the first and third column spacers 301a and 301b have the same height, the third column spacer 301b is separated from the TFT substrate 100 depending on the thickness of the portion of the TFT substrate 100 at the first column spacer 301a.

Figure 8B:
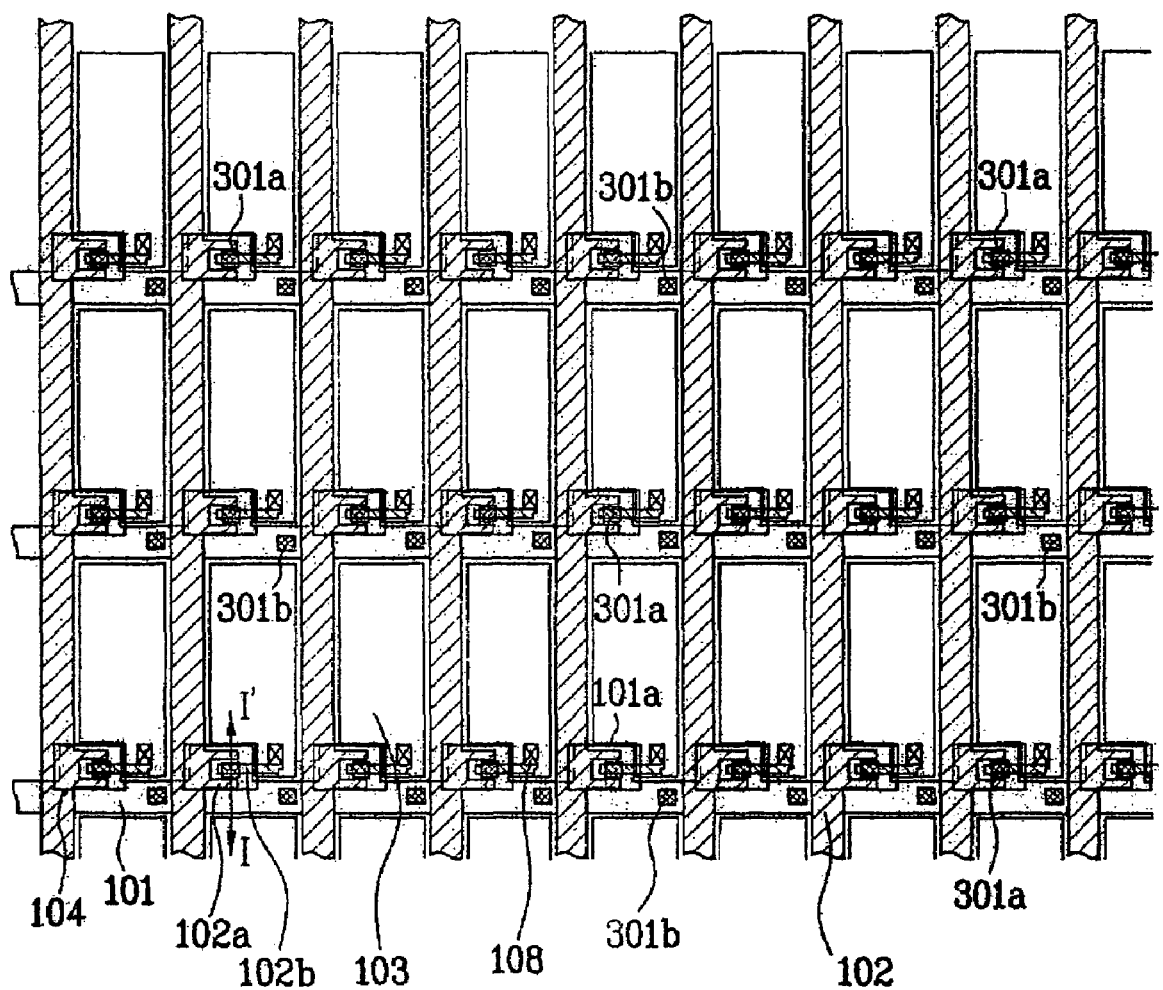

In the embodiment shown in FIG. 8B, each of the first column spacers 301a is disposed in a portion that corresponds to the channel region of the thin film transistor in each pixel region. Each of the third column spacers 301b is disposed in a portion that corresponds to the gate line 101 or the data line 102 in each pixel region.

Figure 8C:
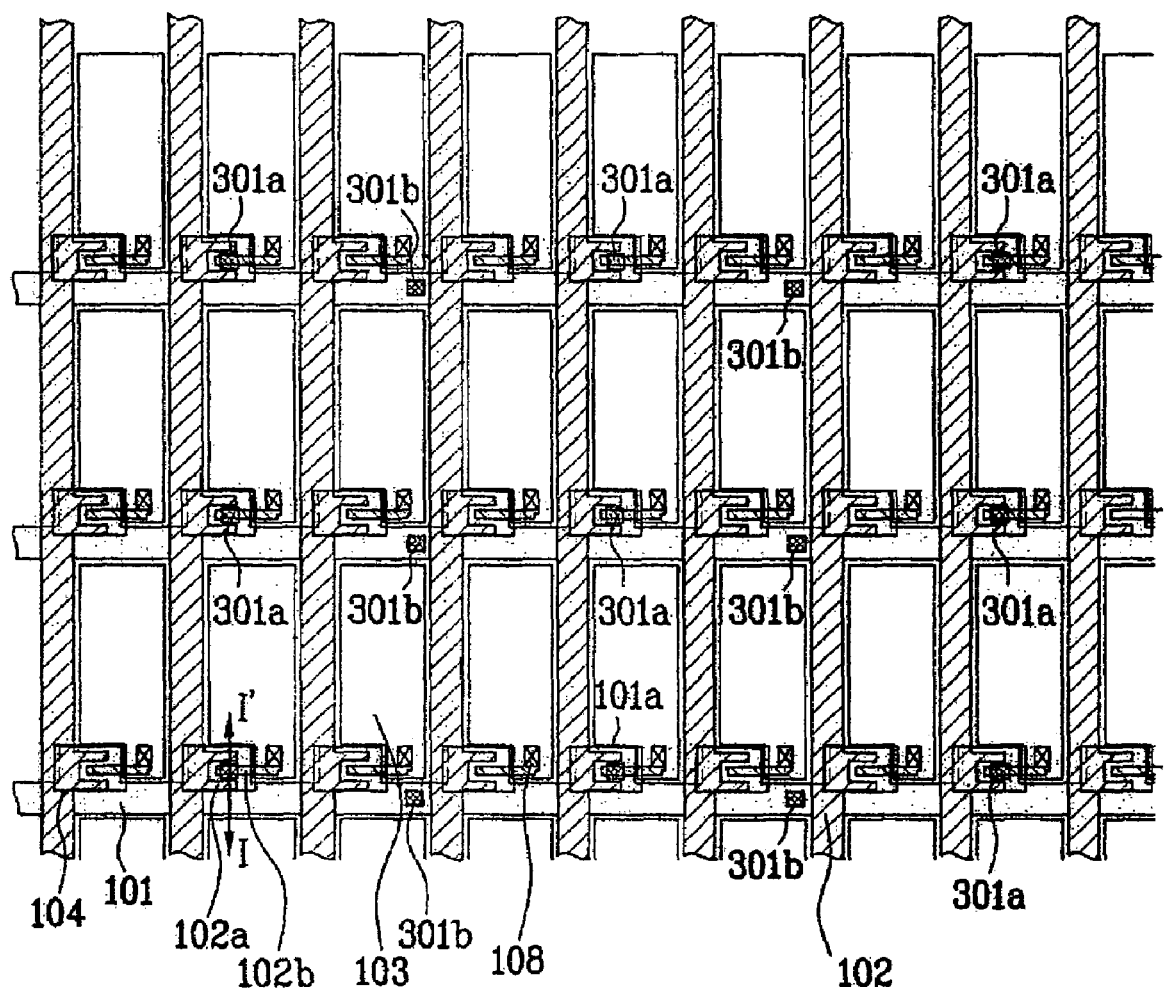

As shown in the embodiment of FIG. 8C, each of the first column spacers 301a is disposed in a portion corresponding to the channel region of the thin film transistor of every three pixel regions. Each of the third column spacers 301b is disposed in a portion corresponding to the gate line 101 or the data line 102 between adjacent first column spacers 301a. As there are three pixel regions in each unit cell (one for each red, green, and blue), this means that there is one first column spacer per unit cell. However, there can be fewer or more than one first column spacer per unit cell. For example, if there are four colors in each unit cell, the first column spacers can be disposed every pixel region or every 4n pixel regions (where n is a natural number).

Figure 8D:
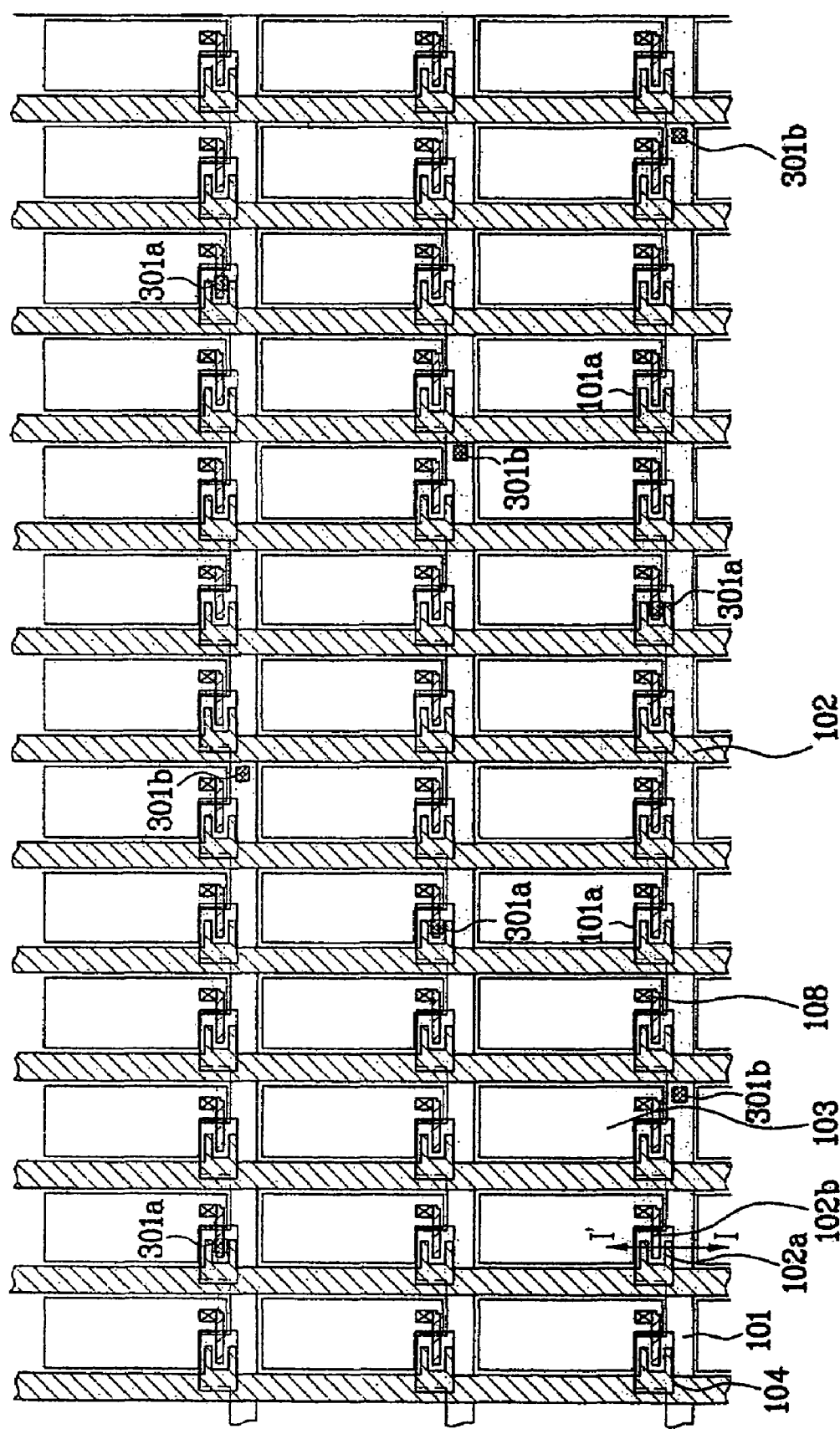

As shown in the embodiment of FIG. 8D, the first column spacer 301a is formed in the portion corresponding to the channel region of the thin film transistor of every nine pixel regions. One or more third column spacers 301b are disposed in a portion corresponding to the gate line 101 or the data line 102 between adjacent first column spacers 301a.

Figure 8E:
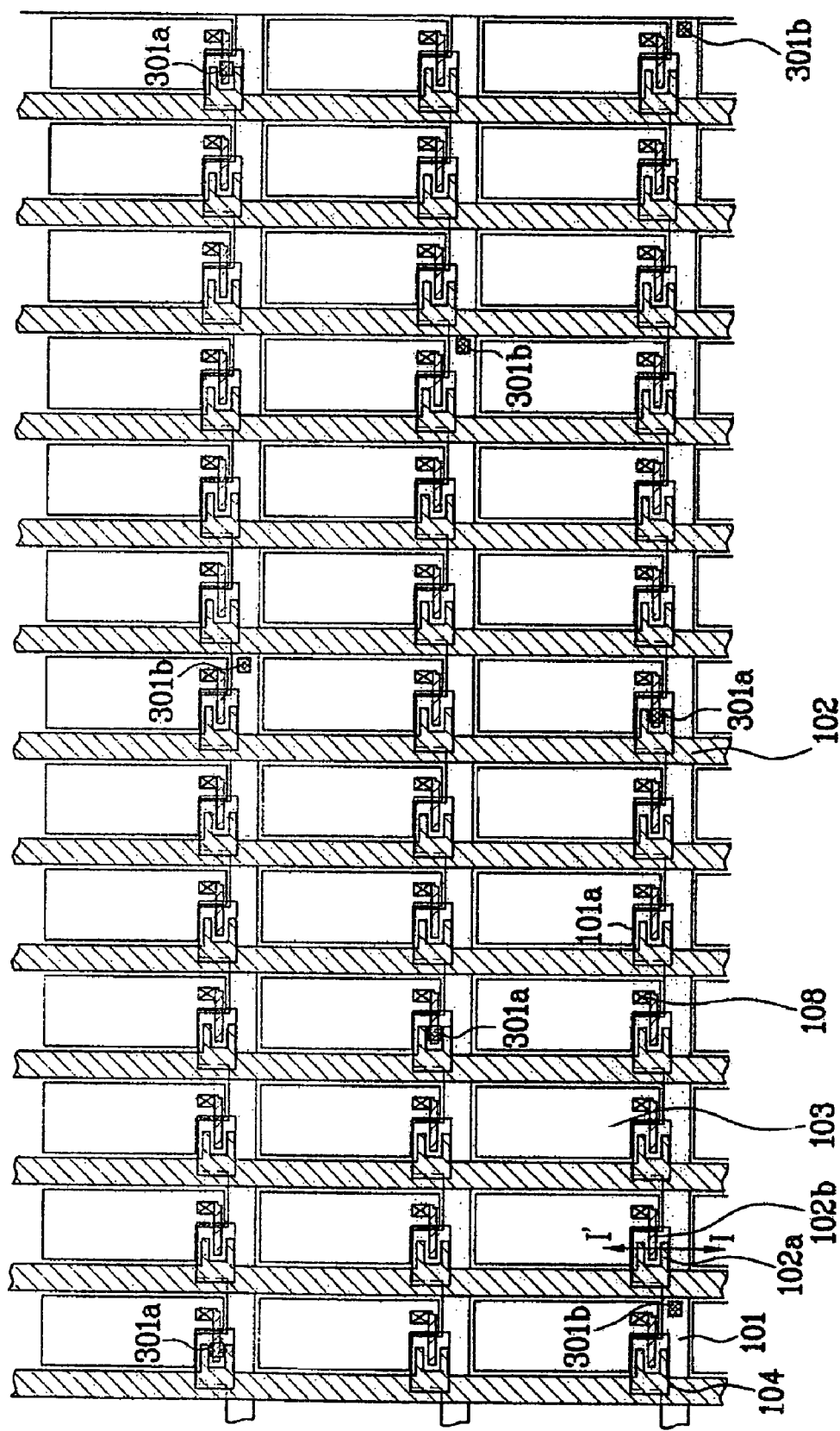

As shown in the embodiment of FIG. 8E, the first column spacers 301a are formed in portions corresponding to the channel region of the thin film transistor of every twelve pixel regions. As above, one or more third column spacers 301b are disposed in a portion corresponding to the gate line 101 or the data line 102 between adjacent first column spacers 301a.

As shown in FIG. 8A, FIG. 8D, and FIG. 8E, the first column spacers 301a are formed in portions corresponding to the channel regions of the thin film transistors of every six, nine or twelve pixel regions associated with a particular gate line. In this case, the first column spacers of the pixel regions associated with an adjacent gate line are offset by three pixel regions such that the first column spacers are diagonally staggered.

For example, if one first column spacer 301a is formed in a portion corresponding to the channel region of the thin film transistor of the '6n'-th numbered pixel region ('n' is a natural number) in an odd numbered pixel line, another first column spacer 301a is formed in a portion corresponding to the channel region of the thin film transistor of the '6n-3'-th numbered pixel region in an even numbered pixel line. Alternatively, if one first column spacer 301a is formed at the '9n'-th numbered pixel region in the '3n-2'-th numbered pixel line, another first column spacer 301a is formed at the '9n-6'-th numbered pixel region in the '3n-1'-th numbered pixel line, and another first column spacer 301b is formed at the '9n-3'-th numbered pixel region in the '3n'-th numbered pixel line. In another embodiment, if first column spacer 301a is formed at the '12n'-th numbered pixel region in the '4n-3'-th numbered pixel line, another first column spacer 301a is formed at the '12n-9'-th numbered pixel region in the '4n-2'-th pixel line, another first column spacer 301a is formed at the '12n-6'-th numbered pixel region in the '4n-1'-th pixel line, and another first column spacer 301a is formed at the '12n-3'-th numbered pixel region in the '4n'-th pixel line.

As described above, the first and third column spacers 301a and 301b may be disposed at every pixel line, at every two pixel lines, or at every three pixel lines. Also, as shown in FIG. 9A and FIG. 9B, the first column spacer 301a is in contact with the TFT substrate 100 in the portion corresponding to the channel region of the thin film transistor, while the third column spacer 301b is separated from the TFT substrate 100 in the portion corresponding to the gate line 101. As shown in these figures, the gate line 101 having a gate electrode 101a is formed on the TFT substrate 100, and a gate insulating layer 105 is formed on the surface of the TFT substrate 100 including the gate line 101. A semiconductor layer 104 is formed on the gate insulating layer 105 above the gate electrode 101a, and the data line 102 is formed on the gate insulating layer 105 perpendicular to the gate line 101. Source and drain electrodes 102a and 102b project from the data line 102 corresponding to a crossing portion with the gate line 101. The source and drain electrodes 102a and 102b overlap both sides of the semiconductor layer 104. A passivation layer 106 is formed on the surface of the TFT substrate including the data line 102. Although not shown in FIG. 9A and FIG. 9B, a contact hole ('108' of FIG. 8) is formed in the drain electrode 102b, and a pixel electrode ('103' of FIG. 8) is formed in the pixel region.

The color filter substrate 200 includes the black matrix layer 201, the color filter layer 202, and a common electrode 203 (for a TN mode LCD device) or overcoat layer 203 (for an IPS mode LCD device). The first column spacer 301a is formed on the common electrode 203 at the portion corresponding to the channel region of the thin film transistor, and the third column spacer 301b is formed on the common electrode 203 at the portion corresponding to the gate line 101. Although not shown, alignment layers are formed on the TFT substrate 100 and the color filter substrate 200 and a rubbing process is performed thereto. The TFT substrate 100 and the color filter substrate 200 are bonded to each other such that a cell gap is maintained therebetween by the first column spacer 301a.

While the first column spacer 301a is shown as contacting the TFT substrate 100 at the portion corresponding to the channel region of the thin film transistor, the first column spacer 301a may be formed at any portion corresponding to the thin film transistor. For example, the first column spacer 301a may be formed on the portion corresponding to the source electrode 102a of the thin film transistor, the drain electrode 102b of the thin film transistor, the gate electrode 101a, or a contact portion between the drain electrode 102b and the pixel electrode 103.

Figure 10A:
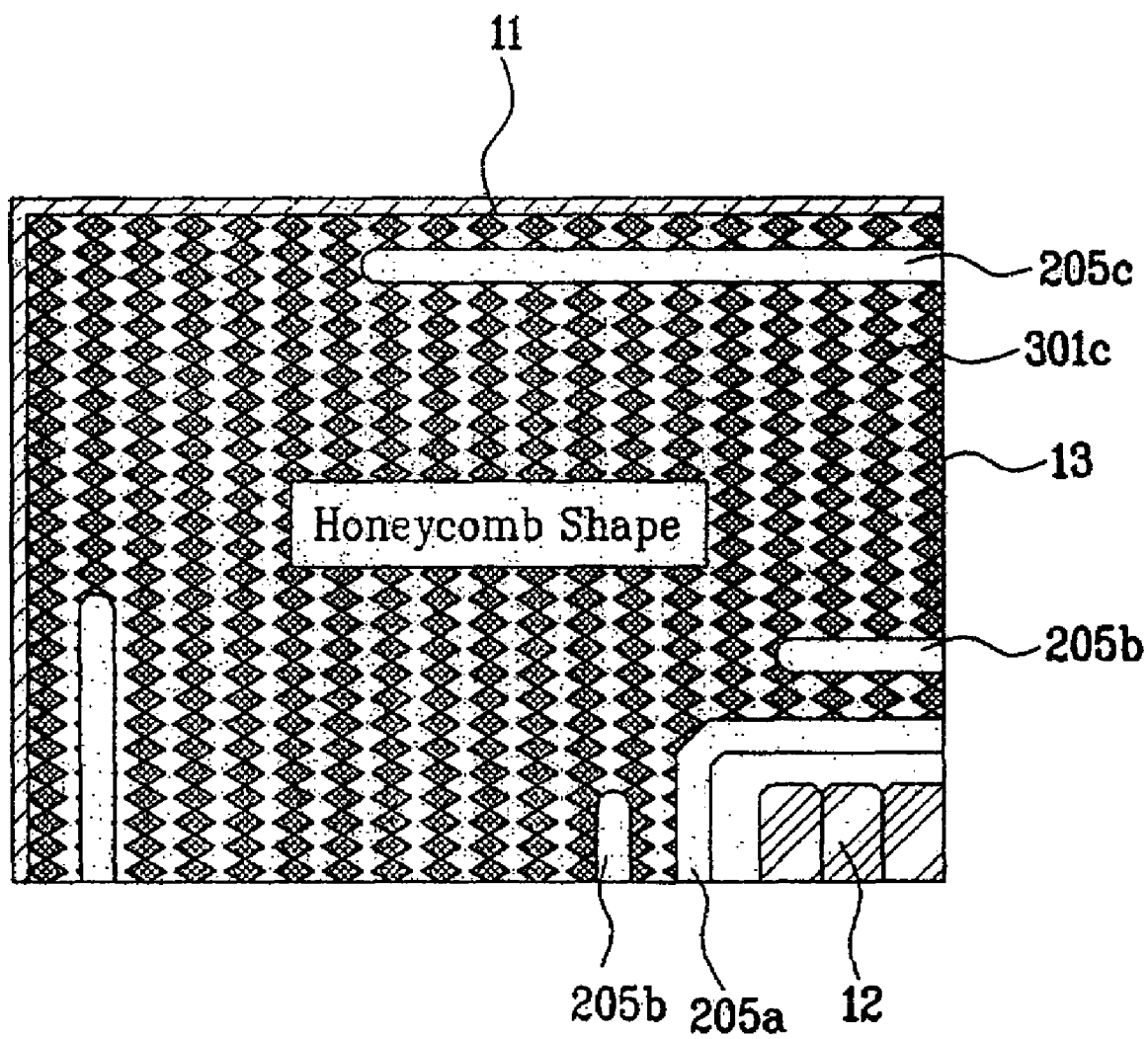
FIG. 10A and FIG. 10B are expanded plane views of a liquid crystal margin region in an embodiment of a LCD device.

To decrease the volume of the liquid crystal margin region 13, as shown in FIG. 10A, second column spacers 301c are disposed in a honeycomb shape in the liquid crystal margin region 13. This honeycomb arrangement can be the same arrangement as the column spacers in the active region. Forming the same arrangement of spacers both in the active region and in the margin region permits a single uniform mask to be used. Of course, the arrangement of the spacers can be different between the active and margin regions and the arrangement in either or both regions can also be non-uniform, as desired.

Figure 10B:
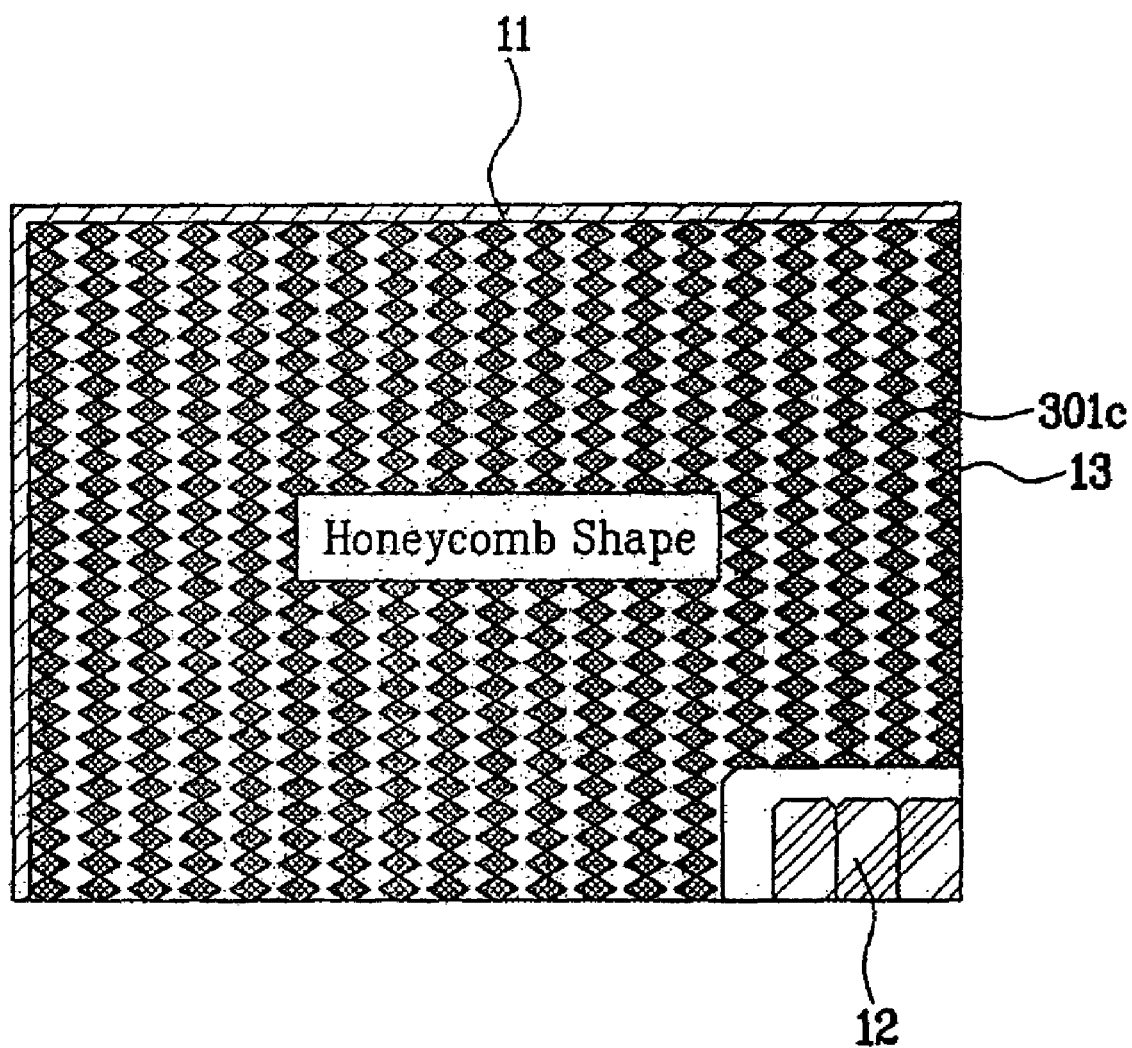

Multiple fluid repositories are formed between the active region 12 and the liquid crystal margin region 13 and in the liquid crystal margin region 13. In one example of this, a first dam 205a and a second dam 205b are formed in the boundary between the active region 12 and the liquid crystal margin region 13, and a third dam 205c is formed around the seal pattern 11. In the remaining portions of the liquid crystal margin region, the second column spacers 301c are formed in a honeycomb shape. In another embodiment, shown in FIG. 10B, no first dam 205a, second dam 205b or third dam 205c is formed in the liquid crystal margin region 13. The second column spacers 301c formed in the liquid crystal margin region 13 may be hexagonal or some other polygonal shape.

Figure 11A:
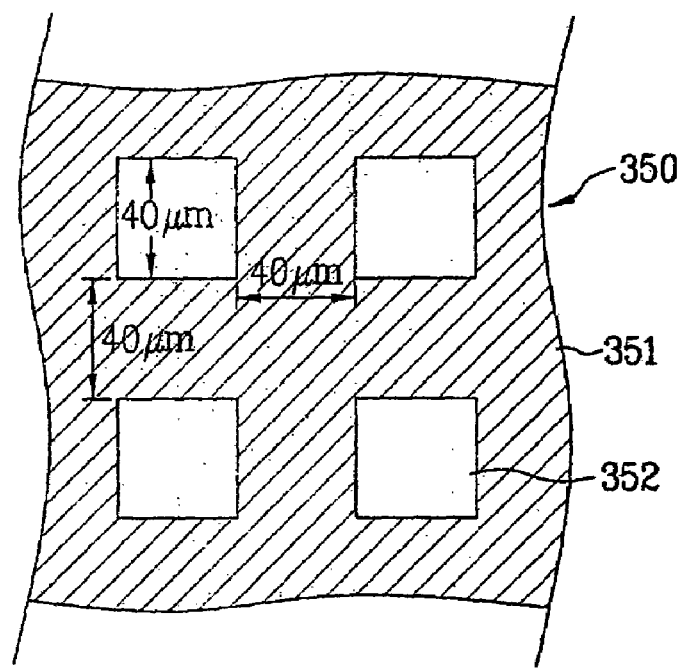
FIGS. 11A and 11B are an expanded plane view and cross sectional view, respectively, of a mask for patterning a third column spacer.
Figure 11B:
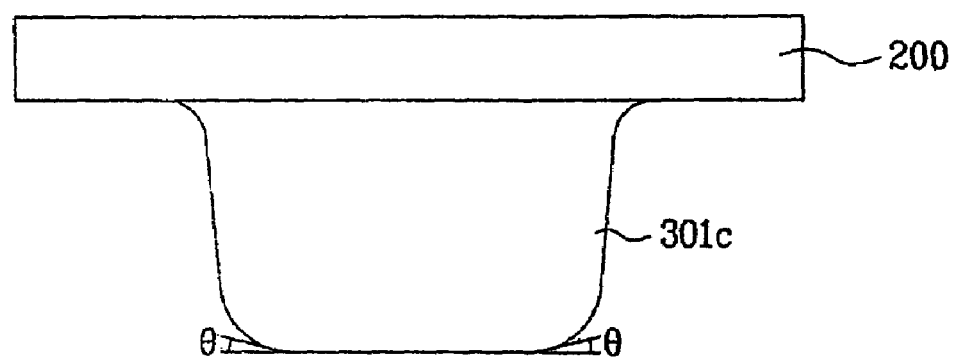

FIG. 11A is an expanded plane view of a mask for patterning the second column spacer. FIG. 11B is an expanded plane view of the second column spacer patterned by FIG. 11A. As shown in FIG. 11A, the mask 350 has a transmission region 352 through which light is transmitted, and a blocking region 351 through which essentially no light is transmitted. The second column spacer 301c is patterned using the transmission region 352 of the mask 350. Each transmission region 352 is a square having sides of about 40 µm. Adjacent transmission regions 352 are disposed to have a square-shaped center portion. When the closed region 351 is formed between the transmission parts 352, the blocking region 351 has a width of about 40 µm corresponding to one side of the transmission region 352. The transmission regions used to form the second column spacers can have either the same or different shapes and/or arrangement as that used to form the first and second column spacers.

Exposure and development processes are performed to form the second column spacer with the mask 350 of FIG. 11A. The results shown in FIG. 11B illustrate that the corners of the second column spacer 301c are rounded due to diffraction of the light during the exposure and development process. As shown, the corners of the second column spacer 301c have an angle of θ from the surface of the TFT substrate.

Figure 12:
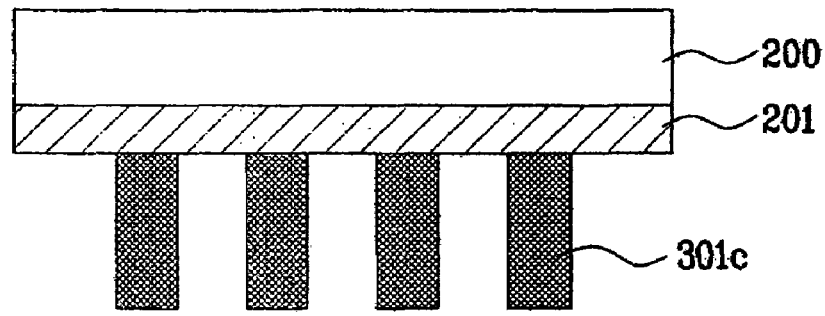
FIG. 12 is a schematic cross sectional view of a liquid crystal margin region according to a first embodiment.
Figure 13:
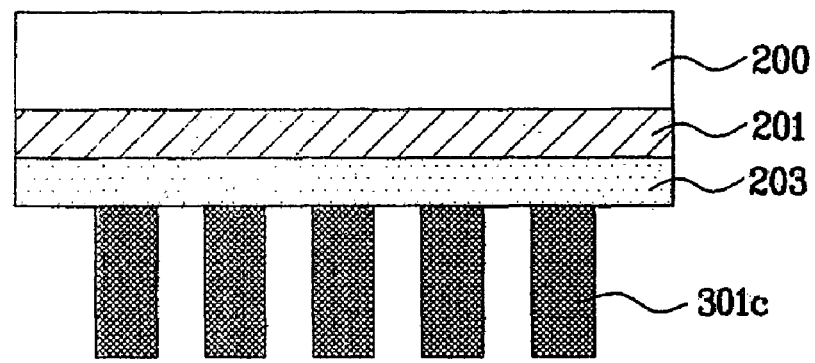
FIG. 13 is a schematic cross sectional view of a liquid crystal margin region according to a second embodiment.
Figure 14:
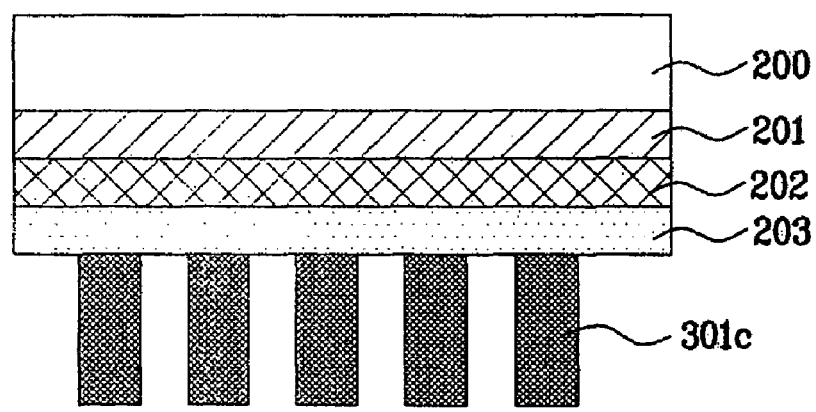
FIG. 14 is a schematic cross sectional view of a liquid crystal margin region according to a third embodiment.

FIGS. 12-14 are schematic cross sectional views of a liquid crystal margin region according to the different embodiments. As images are not displayed in the liquid crystal margin region, the color filter layer, the overcoat layer, and/or the common electrode may or may not be formed in this region. Accordingly, in the embodiment shown in FIG. 12, the black matrix layer 201 is formed on the color filter substrate 200, and then the second column spacers 301c are formed in a honeycomb shape directly on the black matrix layer 201. Alternatively, as shown in FIG. 13, the black matrix layer 201 and the common electrode/overcoat layer 203 are formed on the color filter substrate 200, and the second column spacers 301c are formed in a honeycomb shape on the common electrode/overcoat layer 203. Alternatively, as shown in FIG. 14, the black matrix layer 201, the color filter layer 202 and the common electrode/overcoat layer 203 are formed on the color filter substrate 200, and the second column spacers 301c are formed in a honeycomb shape on the common electrode/overcoat layer 203.

Although not shown, the TFT substrate 100 in the liquid crystal margin region may have various structures depending on the position therein on which the honeycomb-arranged second column spacers 301c are disposed. For example, the gate insulating layer, the semiconductor layer, the passivation layer, the pixel electrode and the alignment layer are disposed over the gate line. In another section, the gate insulating layer, the semiconductor layer, the data line, the passivation layer, the pixel electrode and the alignment layer are disposed on the TFT substrate. In another section, the gate insulating layer, the data line, the passivation layer, the pixel electrode and the alignment layer are disposed on the TFT substrate. In a section that does not contain gate or data lines, the gate insulating layer, the passivation layer and the alignment layer are disposed on the TFT substrate.

Although the thicknesses of the layers on the color filter substrate can vary to some extent, in one example the black matrix layer 201 has a thickness of about 1.3 µm, the color filter layer 202 has a thickness of about 2 µm, and the common electrode 203 has a thickness of about 1.5 µm. The individual layers on the TFT substrate are relatively thinner than the individual layers on the color filter layer. As a result, the structure of the color filter substrate affects the distance between the second column spacer 301c and the TFT substrate to a greater extent than the structure of the TFT substrate. The maximum thickness of TFT substrate 100 in the liquid crystal margin region having the second column spacer 301c is obtained in the region of the TFT substrate 100 that contains the gate line material 101, the gate insulating layer 105, the semiconductor layer 104, the data line material 102, the passivation layer 106, the pixel electrode material 103, and the alignment layer. However, at least one of these layers may be omitted in a particular region in the liquid crystal margin region.

As above, the first, third, and second column spacers 301a, 301b and 301c may be used in TN mode, IPS mode, or other LCD devices. Similarly, thin film transistors with channels of various shapes may be used. These channel shapes include "U"-shaped channels, which are commonly used as they project to a greater extent than other channel shapes, and "L"-shaped channels.

Figure 15:
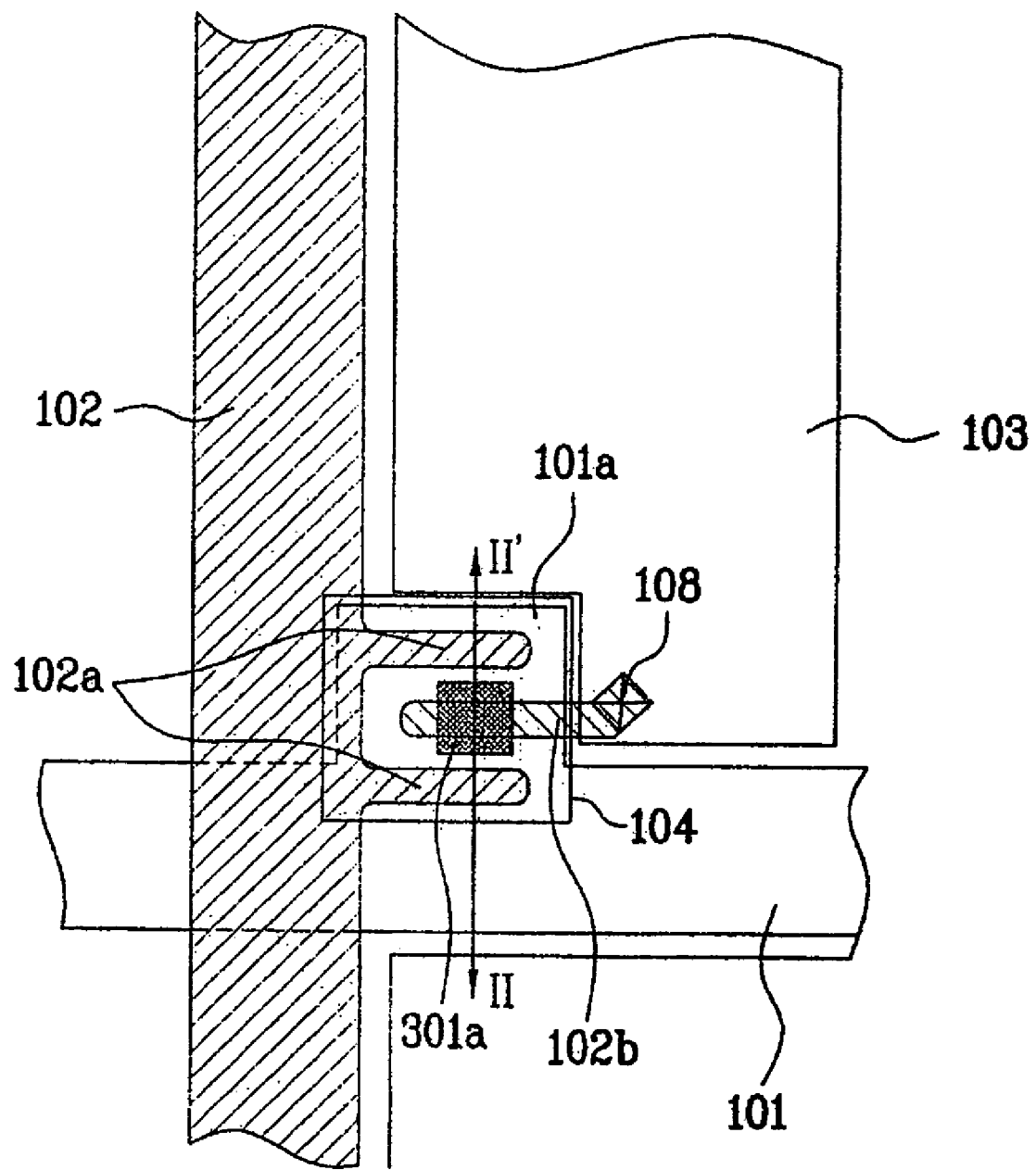
FIG. 15 is an expanded plane view of "U"-shaped channel thin film transistor in an LCD device.
Figure 16:
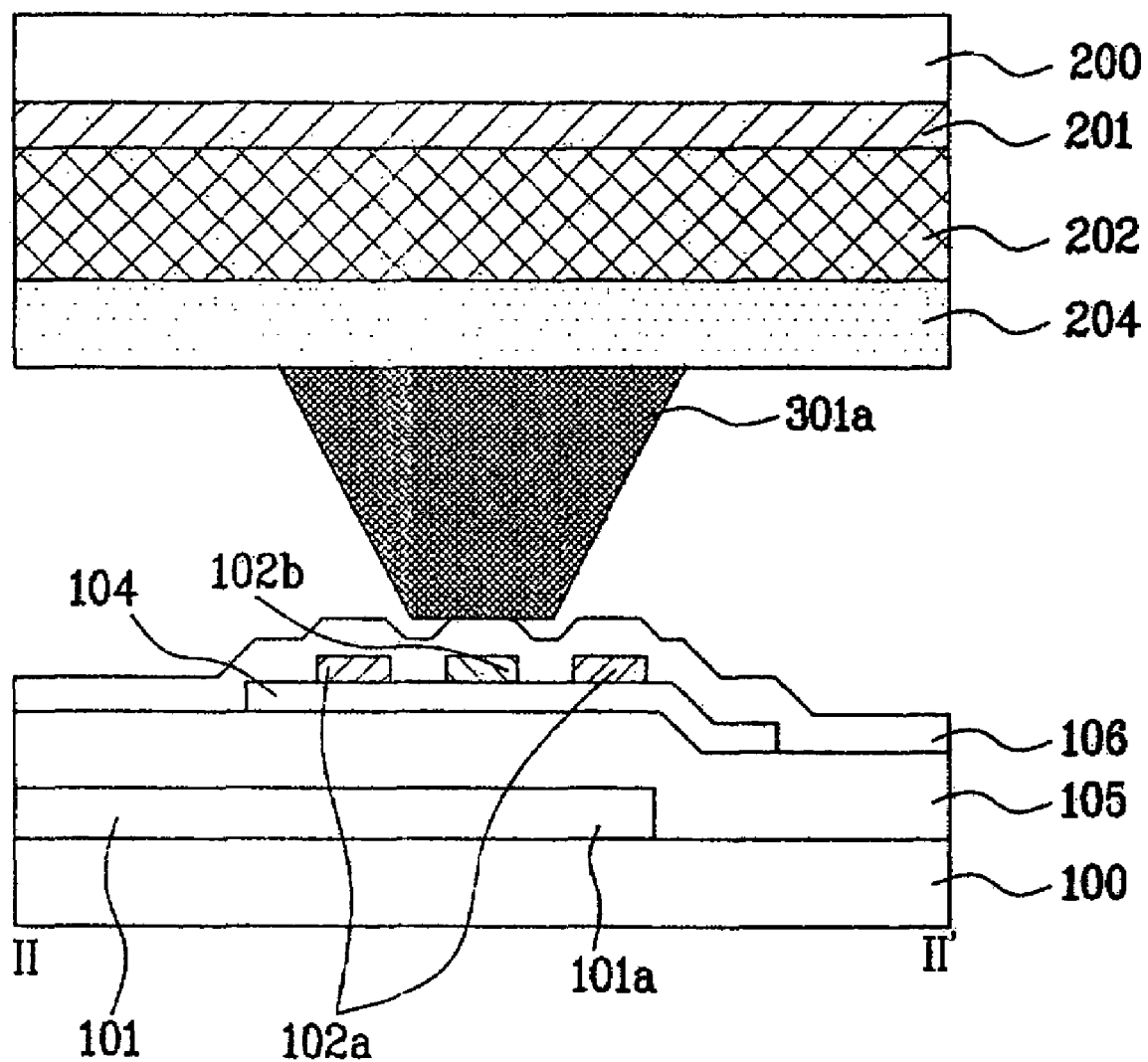
FIG. 16 is a cross sectional view along II-II' of FIG. 8.

FIG. 15 is an expanded plane view of a "U"-shaped channel TFT in an embodiment of an LCD device similar to FIGS. 8A-E. FIG. 16 is a schematic cross sectional view along II-II' of FIG. 15 and is similar to FIG. 9A. In FIG. 15, a gate line 101 is formed on a TFT substrate 100. The gate line 101 has a gate electrode 101a extending in a direction of extension of the data line 102, which is orthogonal to the direction of extension of the gate line 101. As shown in previous figures but not illustrated in FIG. 15, a gate insulating layer is formed on the surface of the TFT substrate 100 over the gate line 101. A semiconductor layer 104 is formed on the gate insulating layer above the gate electrode 101a. A "U"-shaped source electrode 102a overlaps the semiconductor layer 104, and a drain electrode 102b extending toward a pixel region is formed between the "U"-shaped source electrodes 102a. The thin film transistor is formed at a crossing point of the gate line 101 and the data line 102. A passivation layer 106 is formed on the surface of the substrate over the thin film transistor. A contact hole 108 formed in the passivation layer exposes the drain electrode 102b. A pixel electrode 103 is formed in the pixel region and is connected with the drain electrode 102b through the contact hole 108. An alignment layer (not shown) is formed on the surface of the substrate. The TFT substrate and a color filter substrate are then bonded to each other such that first column spacers 301a are positioned in the portion corresponding to the channel region of the thin film transistor of the TFT substrate 100.

Figure 17:
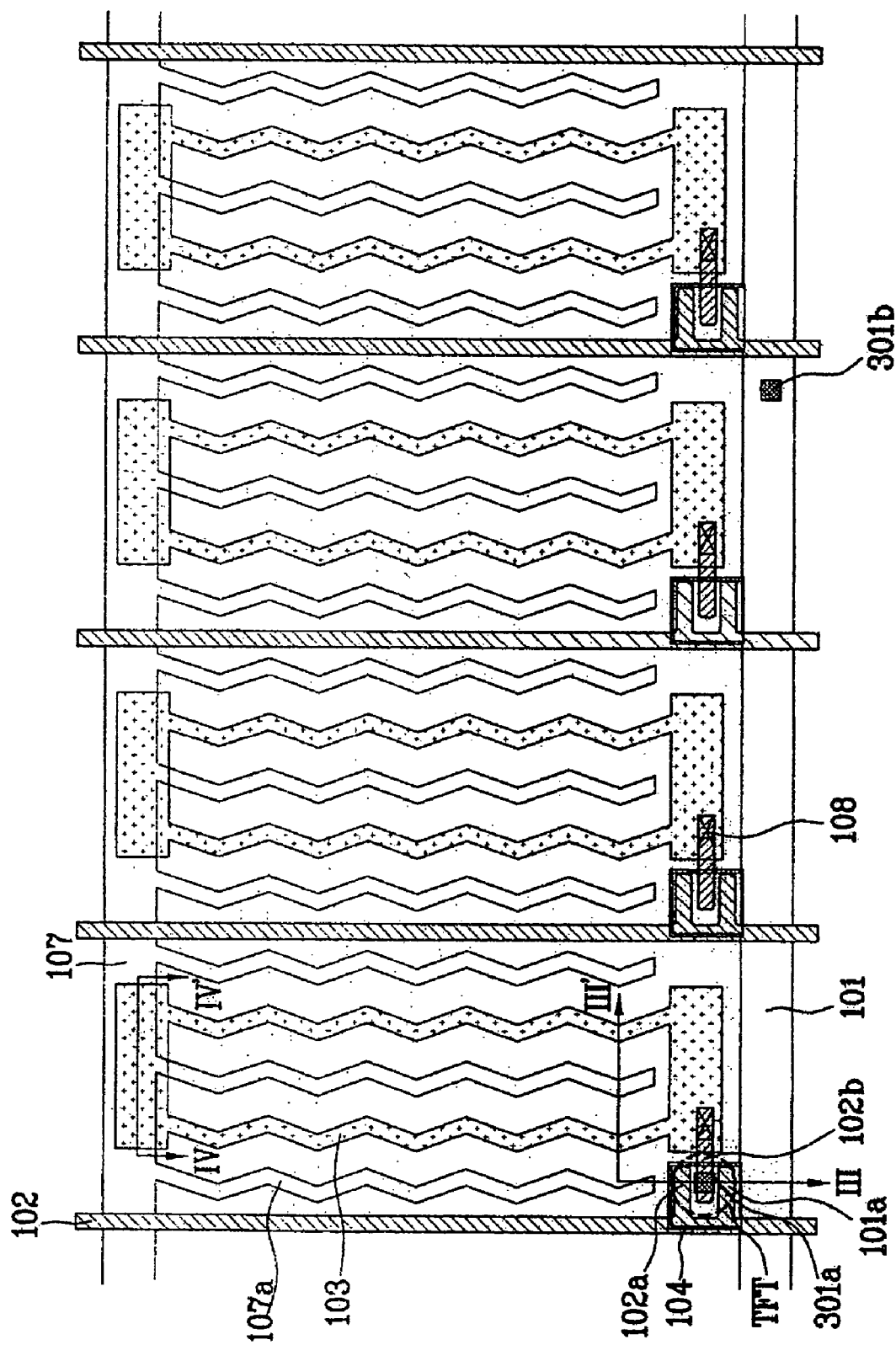
FIG. 17 is a plane view of an IPS mode LCD device.
Figure 18B:
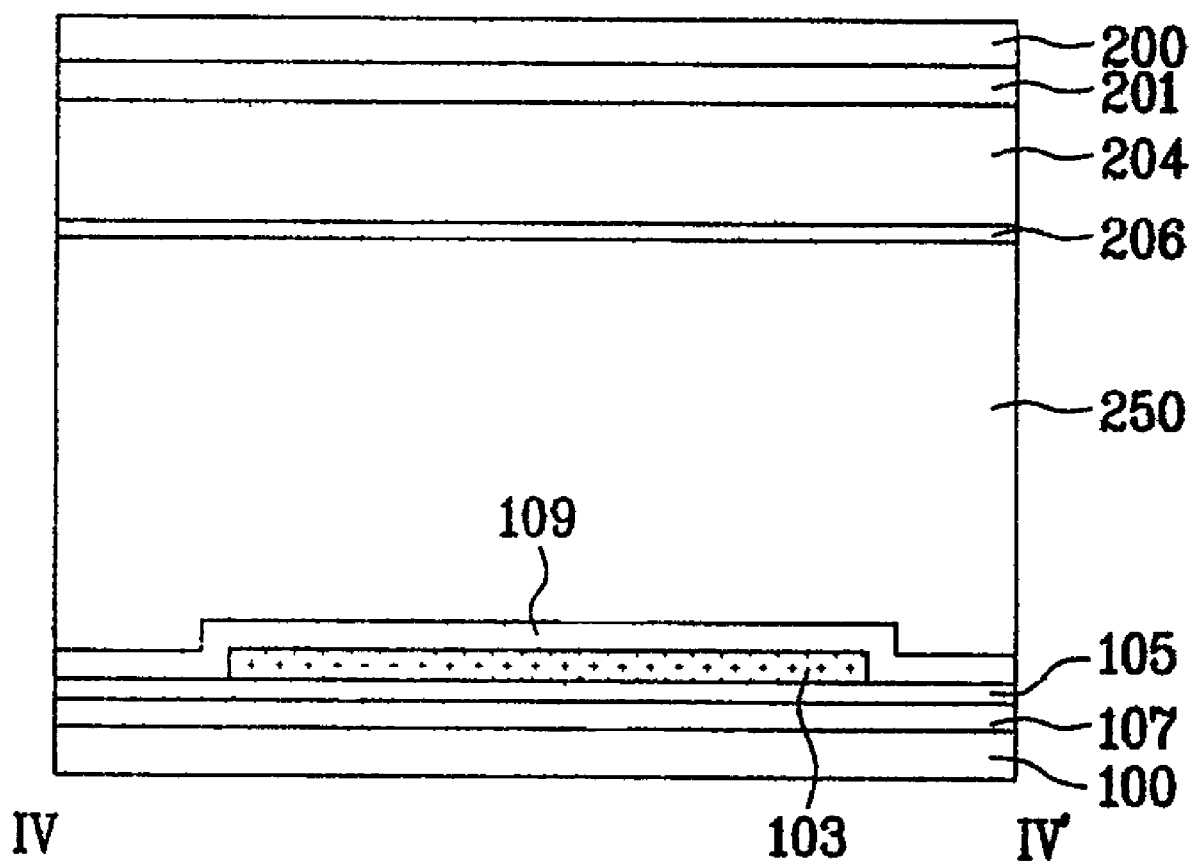

While FIGS. 15 and 16 illustrate a TN mode LCD device, FIG. 17 is a schematic plane view of an IPS mode LCD device. FIG. 18A is a cross sectional view along III-III' of FIG. 17. FIG. 18B is a cross sectional view along IV-IV' of FIG. 17. As shown in FIG. 17, FIG. 18A and FIG. 18B, the IPS mode LCD device includes a color filter substrate 200 and a TFT substrate 100 bonded to each other and a liquid crystal layer 250 injected between the color filter substrate 200 and the TFT substrate 100. More specifically, the TFT substrate 100 includes a plurality of gate lines 101 and a plurality of data lines 102, all formed on a glass substrate. The gate and data lines 101 and 102 are perpendicular to each other to define pixel regions. A common line 107 extends parallel to the gate lines 101, and a plurality of common electrodes 107a extend from the common line 107 toward the thin film transistor TFT at fixed intervals. A thin film transistor TFT formed at each crossing of the gate and data lines 101 and 102 includes source and drain electrodes 102a and 102b. A plurality of pixel electrodes 103 are formed between and parallel to the common electrodes 107a. Each of the pixel electrodes 103 is connected with the drain electrode 102b of the thin film transistor TFT.

A method of fabricating the thin film transistor TFT and the pixel electrode will be described as follows. A metal such as Mo, Al, or Cr is deposited on the surface of the TFT substrate 100 by sputtering or some other means. The metal is then patterned by photolithography to form the gate lines 101, gate electrodes 101a projecting from the gate lines 101, common line 107, and common electrode 107a. Subsequently, $SiN_x$ and/or $SiO_x$ and/or one or more layers containing an insulating material is deposited on the surface of the TFT substrate 100 including the gate lines 101 to form a gate insulating layer 105. An amorphous silicon layer or a polysilicon layer is deposited and patterned to form a semiconductor layer 104 on the gate insulating layer 105 above the gate electrode 101a. A metal, such as Mo, Al, or Cr, is then deposited on the surface of the TFT substrate 100 and patterned by photolithography to form the data lines 102 perpendicular to the gate lines 101. The "U"-shaped source electrode 102a overlaps one side of the semiconductor layer 104 and the drain electrode 102b overlaps the other side of the semiconductor layer 104 between the source electrodes 102a.

After that, a passivation layer 106 is formed on the surface of the substrate including the source electrode 102a and the drain electrode 102b by chemical vapor deposition (CVD) for example. The passivation layer 106 may be formed of an inorganic material such as $SiN_x$ or an organic material having a low dielectric constant, such as BenzoCycloButene (BCB), Spin-on-Glass (SOG,) or acryl, to improve the aperture ratio of liquid crystal cell. The passivation layer 106 is selectively etched on the drain electrode 102b to form a contact hole 108 exposing a portion of the drain electrode 102b. A transparent conductive layer is deposited on the passivation layer 106 by sputtering or the like and is connected with the drain electrode 102b through the contact hole 108. The transparent conductive layer is selectively removed to form pixel electrodes 103 in the pixel region between the common electrodes. A first alignment layer 109 is then formed on the surface of the substrate 100.

The color filter substrate 200 includes a black matrix layer 201, an R/G/B color filter layer 202, and an overcoat layer 204. The black matrix layer 201 is present in portions corresponding to gate and data lines and thin film transistors, and prevents light from impinging on these regions. The black matrix layer 201 is not present in the pixel regions to permit light to pass therethrough. The color filter layer 202 transmits light of various colors at the portions corresponding to the respective pixel regions, and the overcoat layer 204 is formed on the surface of the black matrix layer 201 and the color filter layer 202. First and third column spacers 301a and 301b of a photosensitive material are formed in the active region on predetermined portions of the overcoat layer 204. Second column spacers ('301c' of FIG. 10 and FIG. 11A) are formed in a honeycomb arrangement in the liquid crystal margin region. The first and third column spacers have the same height (about 3.8 μm).

The first column spacers 301a are formed at portions corresponding to the channel regions of the thin film transistors of the TFT substrate 100. The third column spacers 301b are formed at portions corresponding to the gate lines 101 or the data lines 102 of the TFT substrate 100. A second alignment layer 206 is formed on the surface of the color filter substrate 200 including the column spacers 301a, 301b and 301c. The first and second alignment layers 109 and 206 are then rubbed with a cloth at a constant pressure and speed. This aligns polymer chains of the alignment layers along a predetermined direction, thereby determining an initial alignment direction of liquid crystal molecules of the liquid crystal layer. The "U"-channel thin film transistors have small contact surfaces with the first column spacer 301a.

The two substrates are then bonded to each other. A step of about 0.4 μm is present between the channel region of the thin film transistor and the gate line region. As a result, since the first column spacer 301a maintains the cell gap, the third column spacer 301b is separated from the TFT substrate by an amount dependent on the step between the channel region of the thin film transistor and the gate line region. In the above example, however the third column spacer 301b is separated from the TFT substrate by about 0.2 μm, not 0.4 μm. This is smaller than the step between the channel region of the thin film transistor and the gate line region since the first column spacer 301a provides an elastic gap. That is, as the column spacers are formed of a resilient material such as a photosensitive resin, when bonding occurs under pressure, the first column spacer is compressed to decrease the gap.

Accordingly, the first column spacer has an elastic gap of about 0.2 μm to about 0.6 μm or 0.4 μm±0.1 μm, making it possible to increase the gravity margin and diminish the gravity defect. In addition, because the second column spacers 301c are formed in a honeycomb shape in the liquid crystal margin region, the second column spacers 301c function as obstacles to the flow of liquid crystal. Thus, if the LCD device is maintained in a vertical direction, even though an excessive amount of liquid crystal is provided or the LCD device is maintained at a high temperature, it is possible to lessen the gravity defect. Furthermore, as the second column spacer 301c is formed in the liquid crystal margin region, it is possible to decrease the volume of the liquid crystal margin region and to control the flow of liquid crystal from the active region to the liquid crystal margin region. As a result, even if an external force is applied to the active region, only a small amount of liquid crystal moves from the active region to the liquid crystal margin region. This mitigates incomplete dispensation of liquid crystal in the active region. Thus, it is possible to mitigate incomplete dispensation of liquid crystal and increase a margin width of the gravity defect.

Figure 19A:
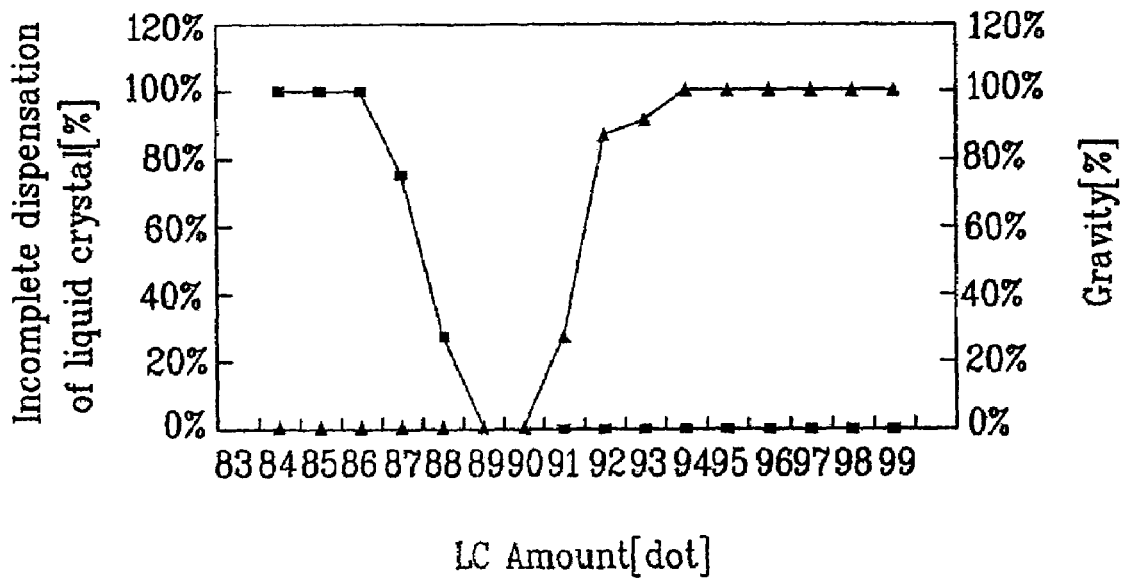
FIGS. 19A and 19B are graphs showing incomplete dispensation of liquid crystal and gravity defect according to the amount of liquid crystal in a related art LCD device and the present LCD.
Figure 19B:
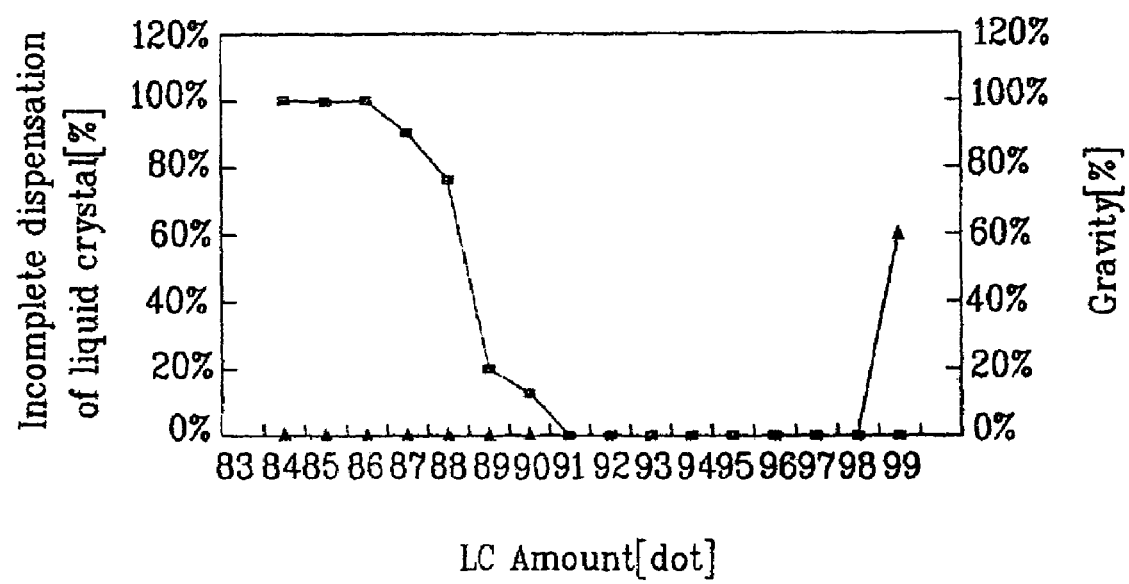

For example, a comparative experiment for the incomplete dispensation of liquid crystal and the gravity defect in a 17-inch TN mode LCD device are shown in FIG. 19. FIG. 19A is a graph showing incomplete dispensation of liquid crystal and the gravity defect depending on the amount of liquid crystal in the related art LCD device. FIG. 19B is a graph showing incomplete dispensation of liquid crystal and the gravity defect depending on the amount of liquid crystal in the present LCD device. In the figures, 1 dot is equal to about 4 mg of liquid crystal/unit area in the active region. This number may be varied, for example, to about 5-6 mg depending on the size of the LCD to maintain the same numbers on the scale on the graph. If the amount of liquid crystal in each dot is changed, of course, the number of dots changes for the same LCD size.

That is, as shown in FIG. 19A, the dispensation of liquid crystal is incomplete if the amount of liquid crystal is below 89 dots in the related art LCD device and a gravity defect exists if the amount of liquid crystal is above 90 dots. As a result, only a small margin exists for solving both problems. However, as shown in FIG. 19B, the dispensation of liquid crystal is incomplete when the amount of liquid crystal is below 89 dots in an embodiment of the present LCD device and a gravity defect is present when the amount of liquid crystal is above 98 dots. Accordingly, the margin for solving the problems has increased by 8 dots.

In comparing FIG. 19A and FIG. 19B, it appears as if incomplete dispensation of liquid crystal in the embodiment of the present LCD device is similar to that of the related art LCD. However, in the embodiment of the present LCD device, the column spacers have the same height as those of the related art. As the first column spacers contact the TFT substrate in the portion corresponding to the channel region of the thin film transistor, the cell gap of the embodiment of the present LCD device is greater than that of the related art LCD device. Thus, the data is misleading as to the incomplete dispensation of liquid crystal since the cell gap of the embodiment of FIG. 19B is larger than that of the related art. If the height of the column spacers are decreased by an amount corresponding to the step coverage of the thin film transistor to obtain the same cell gap as the related art, it is likely that incomplete dispensation of liquid crystal will occur below 89 dots.

As mentioned above, the contact surface between the column spacers and the substrate in the embodiments of the present LCD device is decreased, thereby reducing frictional forces between the column spacers and the TFT substrate, permitting quicker restoration of the liquid crystal molecules to their original state, reducing spot generation in the LCD device as well as internal foreign material generated by peeling of the alignment layer. The first column spacer, which maintains an elastic cell gap, is formed in the portion corresponding to the channel region of the thin film transistor and the second column spacer is formed in the liquid crystal margin region. If the LCD panel is maintained in a vertical direction, even if an excessive amount of liquid crystal is provided or the LCD panel is maintained at a high temperature, the second column spacers decrease movement of the liquid crystal, thereby reducing the gravity defect. The honeycomb shape of the second column spacers permits a decrease in the volume of the liquid crystal margin region, and control of the flow of liquid crystal from the active region to the liquid crystal margin region, this limits liquid crystal inside the active region from flowing into the liquid crystal margin region causing incomplete dispensation of liquid crystal in the active region. The third column spacers separated from the TFT substrate mitigate spots on the screen caused by pressure applied to the screen.

It will be apparent to those skilled in the art that various modifications and variations can be made in the present invention. For example, the spacers can be used in various types of displays other than those using liquid crystals. Thus, it is intended that the present invention covers the modifications and variations of this invention provided they come within the scope of the appended claims and their equivalents.

What is claimed is:

1. A liquid crystal display (LCD) device having an active region and a liquid crystal margin region, the LCD device comprising:
   a first substrate having a thin film transistor array in the active region, the thin film transistor array including thin film transistors and gate and data lines crossing each other to define pixel regions;
   a second substrate having a first column spacer in the active region at a portion corresponding to a channel region of one of the thin film transistors, and a plurality of second column spacers disposed in the liquid crystal margin region, wherein the second column spacers are arranged in a honeycomb shape;
   a third column spacer disposed on the second substrate and being separated from an upper surface of the first substrate having the thin film transistor array at a portion corresponding to the gate line or the data line in the active region, wherein the first, second and third column spacers have the same height;
   a liquid crystal layer disposed between the first and second substrates; and
   a sealant disposed at an outer rim of the liquid crystal margin region, to bond the first and second substrates, thereby filling the liquid crystal layer therein, wherein the liquid crystal margin region is defined between the active region and the sealant,
   wherein the liquid crystal margin region is disposed around the active region.

2. The LCD device of claim 1, wherein the first column spacer provides an elastic gap between the first and second substrates and contacts the first substrate.

3. The LCD device of claim 2, wherein the elastic gap is about 0.2 μm to 0.6 μm.

4. The LCD device of claim 1, wherein the second column spacers are squares, and the adjacent second column spacers are arranged in a square.

5. The LCD device of claim 1, wherein the thin film transistors are "U"-channel thin film transistors that contain gate electrodes extending from the gate lines, "U"-shaped source electrodes, and drain electrodes extending between the source electrodes.

6. The LCD device of claim 1, wherein first column spacers are disposed along a diagonal direction with respect to the gate or data lines.

7. A liquid crystal display (LCD) device comprising:
first and second substrates facing each other, each substrate including an active region and a liquid crystal margin region;
a plurality of gate and data lines crossing each other on the first substrate to define a plurality of pixel regions in the active region;
a plurality of thin film transistors disposed at crossing points of the gate and data lines;
a plurality of pixel electrodes and common electrodes disposed on the first substrate in the pixel regions;
a black matrix layer disposed on the second substrate at portions other than the pixel regions in the active region;
a color filter layer disposed on the second substrate corresponding to the pixel regions in the active region;
an overcoat layer disposed on the second substrate in the active region;
a plurality of first column spacers disposed on the overcoat layer corresponding to a channel region of one of the thin film transistors in the active region;
a plurality of second column spacers disposed on the second substrate corresponding to the liquid crystal margin region, wherein the second column spacers are arranged in a honeycomb shape;
a plurality of third column spacers disposed on the overcoat layer and separated from an upper surface of the first substrate having the gate line and the data line in a portion corresponding to the gate line or the data line in the active region, wherein the first, second and third column spacers have the same height;
a liquid crystal layer disposed between the first and second substrates; and
a sealant disposed at an outer rim of the liquid crystal margin region, to bond the first and second substrates, thereby filling the liquid crystal layer therein, wherein the liquid crystal margin region is defined between the active region and the sealant,
wherein the liquid crystal margin region is disposed around the active region.

8. The LCD device of claim 7, wherein the first column spacer provides an elastic gap between the first and second substrates and contacts the first substrate.

9. The LCD device of claim 7, wherein the second column spacers are squares, and adjacent second column spacers are arranged in a square.

10. The LCD device of claim 7, wherein first column spacers are disposed along a diagonal direction with respect to the gate or data lines.

11. A liquid crystal display (LCD) device comprising:
first and second substrates facing each other, each substrate including an active region and a liquid crystal margin region;
a plurality of gate and data lines crossing each other on the first substrate to define a plurality of pixel regions in the active region;
a plurality of thin film transistors disposed at crossing points of the gate and data lines;
a plurality of pixel electrodes disposed on the first substrate in the pixel regions;
a black matrix layer disposed on the second substrate at portions other than the pixel regions in the active region;
a color filter layer disposed on the second substrate corresponding to the pixel regions in the active region;
a common electrode disposed on the second substrate in the active region;
a plurality of first column spacers disposed on the common electrode of the second substrate corresponding to a channel region of one of the thin film transistors in the active region;
a plurality of second column spacers disposed on the second substrate corresponding to the liquid crystal margin region, wherein the second column spacers are arranged in a honeycomb shape;
a plurality of third column spacers disposed on the second substrate, and being separated from an upper surface of the first substrate having the gate line and the data line at a portion corresponding to the gate line or the data line in the active region, wherein the first, second and third column spacers have the same height;
a liquid crystal layer disposed between the first and second substrates; and
a sealant disposed at an outer rim of the liquid crystal margin region, to bond the first and second substrates, thereby filling the liquid crystal layer therein, wherein the liquid crystal margin region is defined between the active region and the sealant,
wherein the liquid crystal margin region is disposed around the active region.

12. A liquid crystal display (LCD) device having an active region and a liquid crystal margin region, the LCD device comprising:
a first substrate having a thin film transistor array in the active region, the thin film transistor array including a plurality of gate and data lines crossing each other to define a plurality of pixel regions and thin film transistors;
a second substrate having a first column spacer contacting a portion corresponding to the thin film transistors in the active region, and a plurality of second column spacers disposed in the liquid crystal margin region, wherein the second column spacers are arranged in a honeycomb shape;
a third column spacer disposed on the second substrate, and being separated from an upper surface of the first substrate having the thin film transistor array in a portion corresponding to the gate line or the data line in the active region, wherein the first, second and third column spacers have the same height;
a liquid crystal layer disposed between the first and second substrates; and
a sealant disposed at an outer rim of the liquid crystal margin region, to bond the first and second substrates, thereby filling the liquid crystal layer therein, wherein the liquid crystal margin region is defined between the active region and the sealant,
wherein the liquid crystal margin region is disposed around the active region.

13. The LCD device of claim 12, wherein the first column spacers provide an elastic gap between the first and second substrates and contact the first substrate.

14. The LCD device of claim 12, wherein the second column spacers are squares, and adjacent second column spacers are arranged in a square.

15. A method for fabricating an LCD device, the method comprising:
preparing first and second substrates, each substrate having an active region and a liquid crystal margin region, wherein the liquid crystal margin region is formed around the active region;

forming a thin film transistor array including a plurality of gate and data lines and thin film transistors on the active region of the first substrate, the gate and data lines crossing each other to define a plurality of pixel regions;

forming a first column spacer in contact with a portion of the first substrate corresponding to a channel region of one of the thin film transistors in the active region, and a plurality of second column spacers disposed in the liquid crystal margin region, wherein the second column spacers are arranged in a honeycomb shape;

forming a third column spacer on the second substrate, the third column spacer separated from an upper surface of the first substrate having the gate line and data line at a portion corresponding to the gate line or the data line in the active region, wherein the first, second, and third column spacers have the same height;

forming a sealant at an outer rim of the liquid crystal margin region, wherein the liquid crystal margin region is defined between the active region and the sealant;

disposing a liquid crystal layer between the first and second substrates; and bonding the first and second substrates, thereby filling the liquid crystal layer therein.

16. The method of claim 15, further comprising bonding the first and second substrates to each other such that the first column spacer provides an elastic gap between the first and second substrates.

17. The method of claim 15 wherein the second column spacers are squares, and adjacent second column spacers are arranged in a square.

18. The method of claim 15 wherein the second column spacers are disposed by an exposure and development process using a mask having a plurality of transmission and blocking regions.

19. The method of claim 15, further comprising forming first column spacers disposed along a diagonal direction with respect to the gate or data lines.

20. The method of claim 15, further comprising forming an alignment layer on facing surfaces of the first and second substrates.

21. A display device containing an active region and a margin region, the display device comprising:

a first substrate a second substrate opposing the first substrate;

first spacers disposed in the active region that are disposed on one of the first and second substrates, at least some of the first spacers contacting both the first and second substrates;

second spacers disposed in the margin region, the first spacers disposed in a position relative to their respective pixel unit different from a position of the second spacers relative to their respective unit pixel, wherein the second column spacers are arranged in a honeycomb shape;

third spacers disposed on the second substrate, and being separated from an upper surface of the first substrate having the gate line and the data line at a portion corresponding to the gate line or the data line in the active region, wherein the first, second, and third spacers have the same height; and a sealant disposed at an outer rim of the liquid crystal margin region, to bond the first and second substrates, wherein the liquid crystal margin region is defined between the active region and the sealant, wherein the liquid crystal margin region is disposed around the active region.

* * * * *

UNITED STATES PATENT AND TRADEMARK OFFICE
CERTIFICATE OF CORRECTION

| | | |
|---|---|---|
| PATENT NO. | : 7,656,496 B2 | Page 1 of 1 |
| APPLICATION NO. | : 10/949504 | |
| DATED | : February 2, 2010 | |
| INVENTOR(S) | : Kim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 191 days.

Signed and Sealed this

Thirtieth Day of November, 2010

David J. Kappos
*Director of the United States Patent and Trademark Office*